(12) United States Patent
Isoda et al.

(10) Patent No.: US 10,953,638 B2
(45) Date of Patent: Mar. 23, 2021

(54) PLASTIC LAMINATE STRUCTURE

(71) Applicant: HOSIDEN CORPORATION, Yao (JP)

(72) Inventors: Takeshi Isoda, Yao (JP); Naoki Shiga, Yao (JP)

(73) Assignee: HOSIDEN CORPORATION, Yao (JP)

( * ) Notice: Subject to any disclaimer, the term of this patent is extended or adjusted under 35 U.S.C. 154(b) by 0 days.

(21) Appl. No.: 16/295,665

(22) Filed: Mar. 7, 2019

(65) Prior Publication Data

US 2019/0275769 A1    Sep. 12, 2019

(30) Foreign Application Priority Data

Mar. 8, 2018  (JP) .............................. JP2018-042262

(51) Int. Cl.
| | |
|---|---|
| *B32B 27/06* | (2006.01) |
| *G06F 3/041* | (2006.01) |
| *G06F 3/044* | (2006.01) |
| *G02F 1/1333* | (2006.01) |
| *G06F 3/042* | (2006.01) |
| *G06F 3/047* | (2006.01) |

(Continued)

(52) U.S. Cl.
CPC .......... *B32B 27/06* (2013.01); *G02F 1/13338* (2013.01); *G06F 3/044* (2013.01); *G06F 3/0412* (2013.01)

(58) Field of Classification Search
CPC ................................ B32B 27/06; G06F 3/044
See application file for complete search history.

(56) References Cited

U.S. PATENT DOCUMENTS

2011/0248953 A1* 10/2011 Lee ....................... G06F 3/0445
345/174
2014/0333555 A1* 11/2014 Oh ........................ G06F 3/0446
345/173

(Continued)

FOREIGN PATENT DOCUMENTS

JP        2014-081754 A    5/2014

OTHER PUBLICATIONS

Extended European Search Report for European Patent Application No. 19158385.5 dated Aug. 16, 2019 (9 sheets).

*Primary Examiner* — Omar F Mojaddedi
(74) *Attorney, Agent, or Firm* — Kratz, Quintos & Hanson, LLP

(57) ABSTRACT

A plastic laminate structure including layers laminated together, a functional element being an electrode, a display element, an antenna, or a sensor on a second layer of the layers, conductive lines on the second layer, and a dummy conductor on one of the layers. The layers include a first layer of a plastic material and the second layer fixed to the first layer. The first conductive lines are connected to the functional element. The dummy conductor surrounds the functional element and the conductive lines. Each conductive line includes a parallel portion forming at least part of each conductive line. First and second distances are each 500 μm or less. The first distance is a distance in the array direction between the parallel portions. The second distance is a distance between the endmost conductive line and the dummy conductor in a plane direction extending along a face of the second layer.

21 Claims, 12 Drawing Sheets

(51) Int. Cl.
  *G06F 3/046* (2006.01)
  *G02F 1/1343* (2006.01)

(56) References Cited

U.S. PATENT DOCUMENTS

2015/0212537 A1* 7/2015 Cok .................... G06F 3/0416
                                             345/174
2016/0274727 A1   9/2016 Nakamura
2017/0262132 A1* 9/2017 Kida .................... G06F 3/0418

* cited by examiner

PLASTIC LAMINATE STRUCTURE

CROSS-REFERENCE TO RELATED APPLICATIONS

The present application claims priority under 35 U.S.C. § 119 of Japanese Patent Applications No. 2018-042262 filed on Mar. 8, 2018, the disclosure of which is expressly incorporated by reference herein in its entirety.

BACKGROUND OF THE INVENTION

Technical Field

The invention relates to plastic laminate structures, such as touch sensing devices.

Background Art

A conventional touch sensing device is disclosed in Japanese Unexamined Patent Application No. 2014-81754. The touch sensing device includes a translucent substrate having a display region, a decorative layer, a plurality of electrodes, a plurality of conductive lines, and dummy conductors. The decorative layer is formed on a part of the translucent substrate other than the display region. The electrodes are provided at spaced intervals on the display region of the translucent substrate. The conductive lines are provided on the decorative layer and connected to the respective electrodes. The dummy conductors are provided on a part of the decorative layer other than the conductive lines, in spaced relation to the conductive lines. The distance between the conductive lines and the respective dummy conductors is 50 μm or less, making it difficult for a user to visually recognize that the conductive lines through the decorative layer and the translucent substrate. In other words, the above distance is set only for the purpose of decreasing the visibility of the conductive lines.

SUMMARY OF INVENTION

Another problem with the above conventional touch sensing device may arise where the translucent substrate is formed of a plastic material, e.g., polycarbonate resin, polymethyl methacrylate resin, ABS resin, or PET resin. Particularly, a very small thickness of the conductive lines, i.e. a level difference, may result in that the shapes of the conductive lines may be transferred and raised onto the surface of the translucent substrate (hereinafter referred to as a rising phenomenon).

The invention has been made in view of the above circumstances and provides a plastic laminate structure in which conductive line are less likely to cause the rising phenomenon.

A plastic laminate structure of a first aspect of the invention includes a plurality of layers laminated together, at least one first functional element, a plurality of first conductive lines, and at least one first dummy conductor. The layers include a first layer of a plastic material and a second layer. The first layer includes a first face and a second face on an opposite side to the first face. The second layer is fixed directly or indirectly to the second face of the first layer. The or each first functional element is an electrode, a display element, an antenna, or a sensor, for example, and provided on the second layer. The first conductive lines are provided on the second layer, and at least one of them is connected to the at least one functional element. The first conductive lines include an endmost first conductive line being an endmost one of the first conductive lines. The at least one first dummy conductor is provided on one of the layers and surrounds the at least one first functional element and the first conductive lines.

Each of the first conductive lines includes a parallel portion forming at least part of the each first conductive line. The parallel portions of the first conductive lines are arrayed in an array direction in spaced and parallel relation to each other.

The plastic laminate structure may further include at least one second dummy conductor. The or each second dummy conductor may preferably be provided on one of the layers and positioned at least part of a corresponding area between adjacent ones of the first conductive lines.

The plastic laminate structure may have one of the following configurations 1) to 3). 1) A first distance and a second distance are each 500 μm or less. 2) The second distance and a third distance are each 500 μm or less. 3) The first distance, the second distance, and the third distance are each 500 μm or less.

The first distance may be a distance in the array direction between adjacent ones of the parallel portions of the first conductive lines. The array direction may be a direction in which the parallel portions are arrayed.

The second distance may be a distance in a plane direction between the endmost first conductive line and the at least one first dummy conductor. The plane direction may extend along a face of the second layer.

The third distance may be a distance in the plane direction between the or each second dummy conductor and one of the first conductive lines that is located next to the same second dummy conductor.

Where the plastic laminate structure has configuration 2), the first conductive lines may not include the parallel portions.

The plastic laminate structure having one of the above configurations 1) to 3) suppresses the rising phenomenon that the shapes of the first conductive lines are transferred and raised onto the first face of the first layer.

The at least one first dummy conductor may be provided as a plurality of first dummy conductors. The first dummy conductors may be arrayed at spaced intervals on one of the layers. The plastic laminate structure of this aspect reduces unintentional electric coupling of one or more of the first dummy conductors with the or a respective first conductive line. Even if one or more of the first dummy conductors are electrically coupled to the or a respective first conductive lines, the coupling capacitance is advantageously lowered.

A fourth distance may be 500 μm or less. The fourth distance may be a distance between adjacent ones of the first dummy conductors. The plastic laminate structure of this aspect suppresses the rising phenomenon that the shapes of the first dummy conductors are transferred and raised onto the first face of the first layer.

The first conductive lines may include at least one pair of adjacent first conductive lines, and the or each pair of adjacent first conductive lines may include one and the other first conductive lines. The at least one second dummy conductor may be provided as a plurality of second dummy conductors. The second dummy conductors, or some of the second dummy conductors, may be positioned at spaced intervals between the one and the other first conductive lines of the corresponding pair. The plastic laminate structure of this aspect suppresses or prevents unintentional electric coupling of at least one of the first conductive lines of the or each pair to at least one of the second dummy conductor located between the first conductive lines of the same pair. Even if the at least one first conductive line is electrically coupled to the at least one second dummy conductor, the coupling capacitance is advantageously lowered.

A fifth distance may be 500 μm or less. The fifth distance may be a distance between adjacent ones of the second dummy conductors. The plastic laminate structure of this aspect suppresses the rising phenomenon that the shapes of the second dummy conductors are transferred and raised onto the first face of the first layer.

The or each first dummy conductor may include a body and a plurality of mini-conductors. The mini-conductors may be arranged between the body and the at least one first functional element, and/or between the body and the at least one first conductive line. The mini-conductors of the or each first dummy conductor may be arranged or configured at a gradually reduced density from the end of the body toward the or each first functional element and/or toward the or each first conductive line. Some of the mini-conductors that are located in the vicinity of the body may preferably be integrated with the body. For example, the mini-conductors of the or each first dummy conductor may have one of the following aspects 1) to 3):

1) The mini-conductors may be arranged in dot pattern between the body and the or a respective first functional element, or between the body and the or a respective first conductive line. The mini-conductors may have external sizes gradually increasing with increasing distance from the same first functional element, or from the same first conductive line. Some of the mini-conductors that are located in the vicinity of the body may be integrated with the body.

2) The mini-conductors may be arranged at spaced intervals between the body and the or a respective first functional element, or between the body and the or a respective first conductive line. The mini-conductors may have elongated shapes extending perpendicularly to the array direction of the mini-conductors. The mini-conductors may have dimensions in the array direction gradually increasing with increasing distance from the same first functional element, or from the same first conductive line; or alternatively, the mini-conductors may be arranged at gradually decreasing spaced intervals in the array direction with increasing distance from the same first functional element, or from the same first conductive line. One or more of the mini-conductors that are located in the vicinity of the body may be integrated with the body.

3) The mini-conductors may be shaped like comb teeth extending from the end of the body toward the or a respective first functional element, or toward the or a respective first conductive line. The mini-conductors (i.e. the teeth) gradually taper from the end of the body toward the same first functional element, or toward the same first conductive line.

The plastic laminate structure of any of the above aspects 1) to 3) suppresses the rising phenomenon that the shapes of the first conductive lines are transferred and raised onto the first face of the first layer.

The first layer may further include a decorative portion formed on the first or second face. The decorative portion may include an opening and a circumferential portion around the opening. The mini-conductors may be arranged below the circumferential portion. The plastic laminate structure of this aspect, having the mini-conductors of one of the above configurations 1) to 3), suppresses the rising phenomenon that the boundary between the opening and the circumferential portion of the decorative portion is transferred and raised onto the first face of the first layer.

The or each second dummy conductor may include a body and a plurality of mini-conductors; the mini-conductors of the or each second dummy conductor include a first set of mini-conductors, which may be provided near at least part of one of adjacent two of the first conductive lines, and a second set of mini-conductors, which may be provided near at least part of the other of the adjacent two first conductive lines; the body of the or each second dummy conductor may be provided between the first set of mini-conductors and the second set of mini-conductors. In this case, the mini-conductors of the or each second dummy conductor may have one of the following aspects 1) to 3):

1) Each set of the mini-conductors of the or each second dummy conductor may be arranged in dot pattern between the body and the adjacent first conductive line. The mini-conductors may have external sizes gradually increasing with increasing distance from the adjacent first conductive line. Some of the mini-conductors that are located in the vicinity of the body may be integrated with the body.

2) Each set of the mini-conductors of the or each second dummy conductor may be arranged at spaced intervals between the body and the adjacent first conductive line. The mini-conductors may have elongated shapes extending perpendicularly to the array direction of the mini-conductors. The mini-conductors may have dimensions in the array direction gradually increasing with increasing distance from the adjacent first conductive line; or alternatively, the mini-conductors may be arranged at gradually decreasing spaced intervals in the array direction with increasing distance from the adjacent first conductive line. One or more of the mini-conductors that are located in the vicinity of the body may be integrated with the body.

3) Each set of the mini-conductors of the or each second dummy conductor may be shaped like comb teeth extending from the end of the body toward the adjacent first conductive line. The mini-conductors (i.e. the teeth) may gradually taper from the end of the body toward the adjacent first conductive line.

The plastic laminate structure including the at least one second dummy conductor of any of the above aspects suppresses the rising phenomenon that the shapes of the first conductive lines are transferred and raised onto the first face of the first layer.

The at least one first functional element may be provided as a plurality of first functional elements. In this case, the first conductive lines may be connected to the respective first functional elements.

The second layer may have a first face and a second face. The first face of the second layer may be fixed directly or indirectly to the second face of the first layer. The second face of the second layer may be on the opposite side to the first face.

The plurality of layers may further include a third layer to be fixed directly or indirectly to the second face of the second layer.

The plastic laminate structure of any of the above aspects may further include at least one second functional element and a plurality of second conductive lines. In this case, the or each second functional element may be an electrode, a display element, an antenna, or a sensor, for example, and may be provided on one of the layers. The second conductive lines may be connected to the at least one second functional element. The second conductive lines may be provided on one of the layers, e.g. on the second or third layer. Where the second conductive lines are provided on the second layer, it is preferable that the at least one first functional element and the first conductive lines be provided on one of the first and second faces of the second layer, and that the at least one second functional element and the second conductive lines be provided on the other face of the second layer.

Figure 1A:
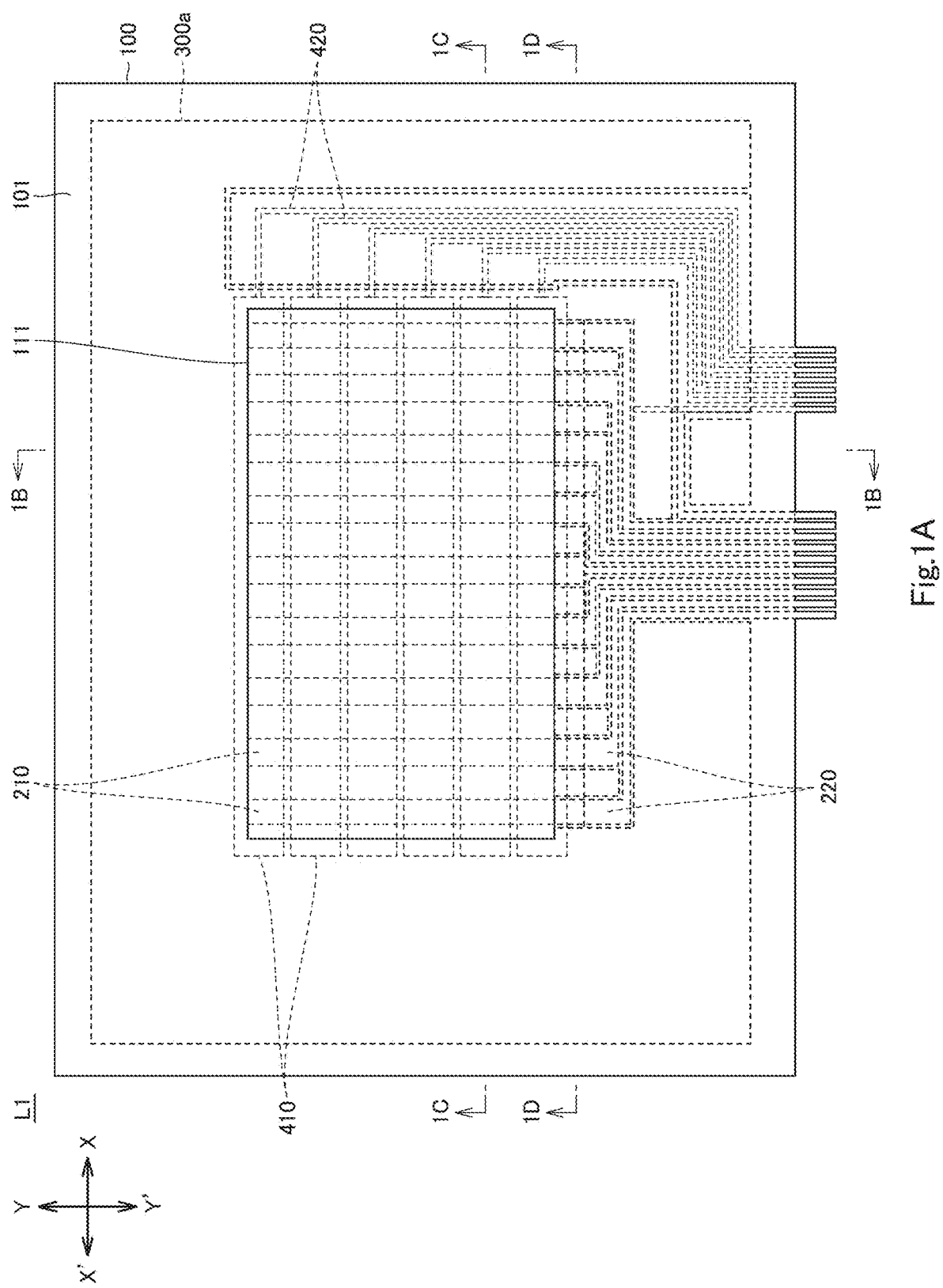
FIG. 1A is a schematic plan view of a plastic laminate structure according to the first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the plastic laminate structure and its constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Various embodiments of the invention will now be described.

First Embodiment

A plastic laminate structure L1 according to a plurality of embodiments including a first embodiment of the invention will now be described with reference to FIGS. 1A to 3. FIGS. 1A to 2C illustrates a plastic laminate structure L1 according to the first embodiment. FIG. 3 illustrates a variant of the plastic laminate structure L1 of the first embodiment. The plastic laminate structure L1 is a capacitive touch sensing device.

Figure 1B:
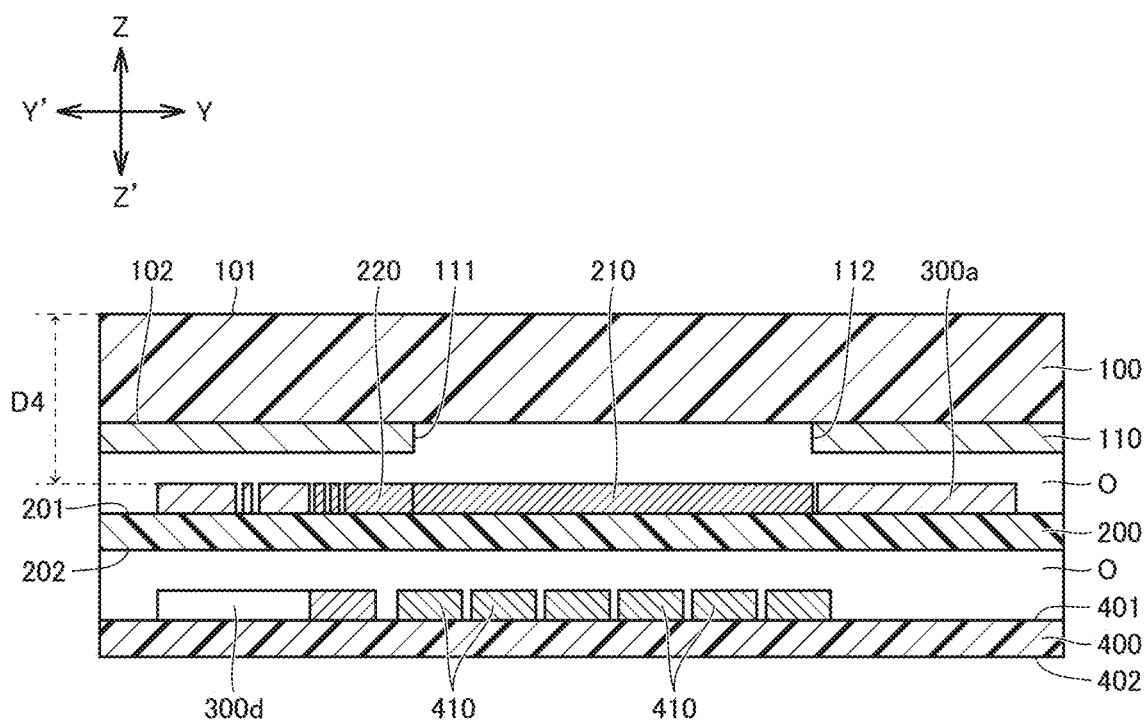
FIG. 1B is an enlarged cross-sectional view of the plastic laminate structure taken along line 1B-1B in FIG. 1A.
Figure 1C:
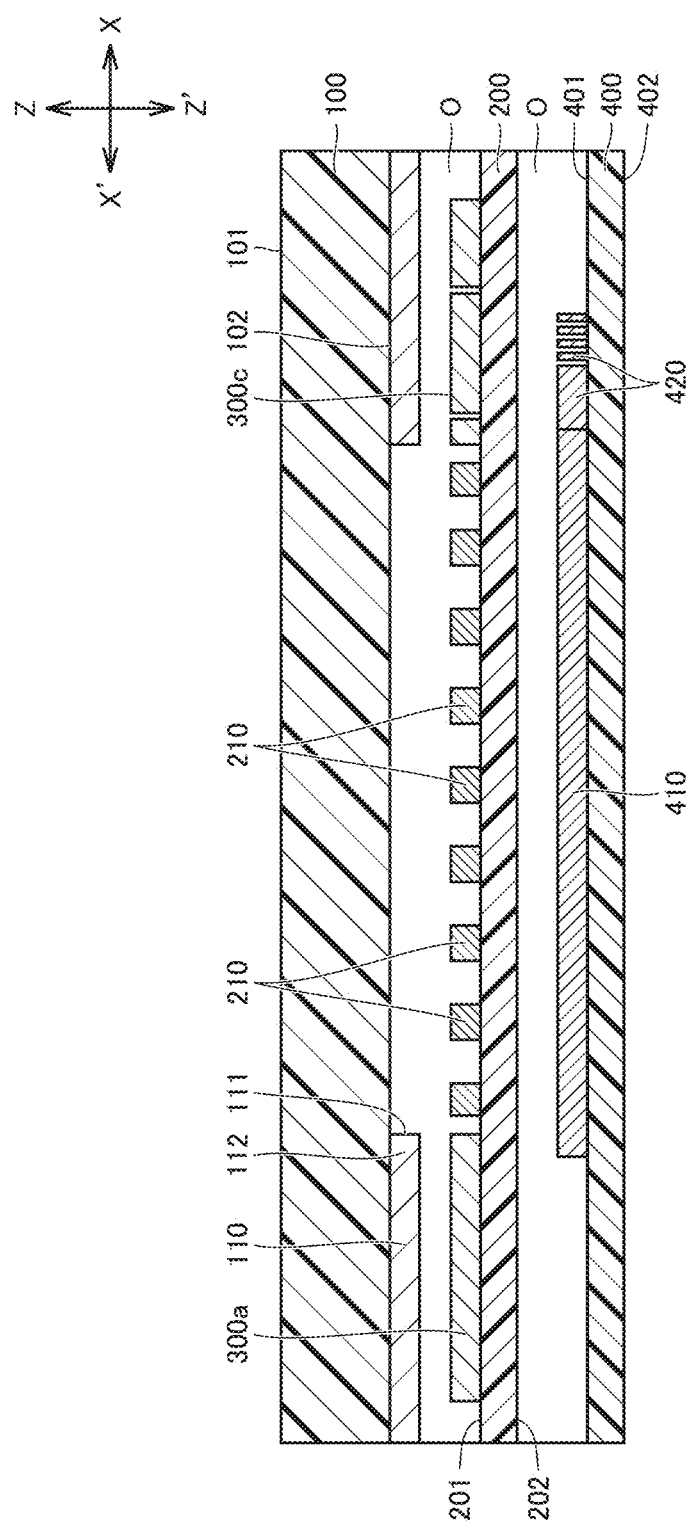
FIG. 1C is an enlarged cross-sectional view of the plastic laminate structure taken along line 1C-1C in FIG. 1A.
Figure 1D:
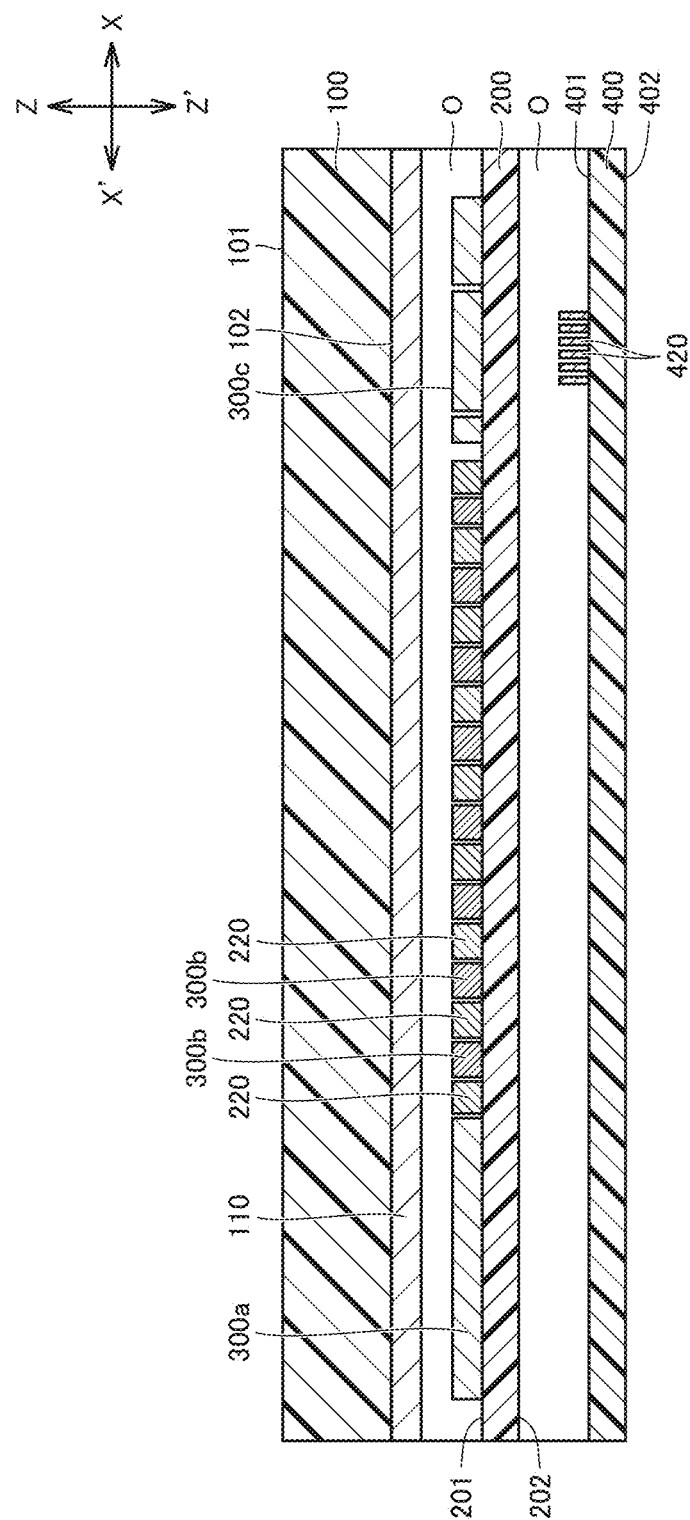
FIG. 1D is an enlarged cross-sectional view of the plastic laminate structure taken along line 1D-1D in FIG. 1A.

The plastic laminate structure L1 includes a plurality of layers laminated together in a direction (hereinafter referred to as the "lamination direction"). The layers include a first layer 100 and a second layer 200. FIGS. 1B to 1D show the lamination direction as a Z-Z' direction. In the Z-Z' direction, the Z-direction side is the top layer side of the touch sensing device, i.e. the side exposed to the outside, while the Z'-direction side is the deeper layer side of the touch sensing device, i.e. the opposite side to the top layer side. FIGS. 1A and 1B shows the Y-Y' direction perpendicular to the Z-Z' direction. FIGS. 1A, 1C, and 1D shows the X-X' direction perpendicular to the Z-Z' and Y-Y' directions.

The first layer 100 is a plate or film formed of plastic material (e.g., polycarbonate (PC) resin, polymethyl methacrylate (PMMA) resin, acrylonitrile butadiene styrene (ABS) resin, polyethylene terephthalate (PET) resin, cycloolefin polymer (COP) resin, or DURABIO (registered trademark) resin). The first layer 100 is required to be at least partly translucent. For example, the first layer 100 may be partly or entirely transparent. The first layer 100 may be, but is not limited to, a cover panel being the top layer of the touch sensing device. The first layer 100 may preferably have a thickness in the range of 10 μm to 1 mm, for example. The first layer 100 has a first face 101 and a second face 102 on the opposite side to the first face 101. Where the first layer 100 is a cover panel, the first face 101 is an outermost face (top face) of the touch sensing device and includes a touch sensing region to be contacted by a detection object, such as a finger of a user or a stylus. The first face 101 of the first layer 100 may be subjected to treatment (e.g., coating treatment) for providing a function such as an acrylic layer, a hard-coating layer, an anti-glare layer, an anti-Newton layer, a low-reflective layer, a protective layer, an anti-fingerprint layer, a self-repair layer, an antimicrobial layer, an anti-static layer, a strength retention layer, and/or an stain-proof layer, or the like, but is not limited thereto.

Figure 2A:
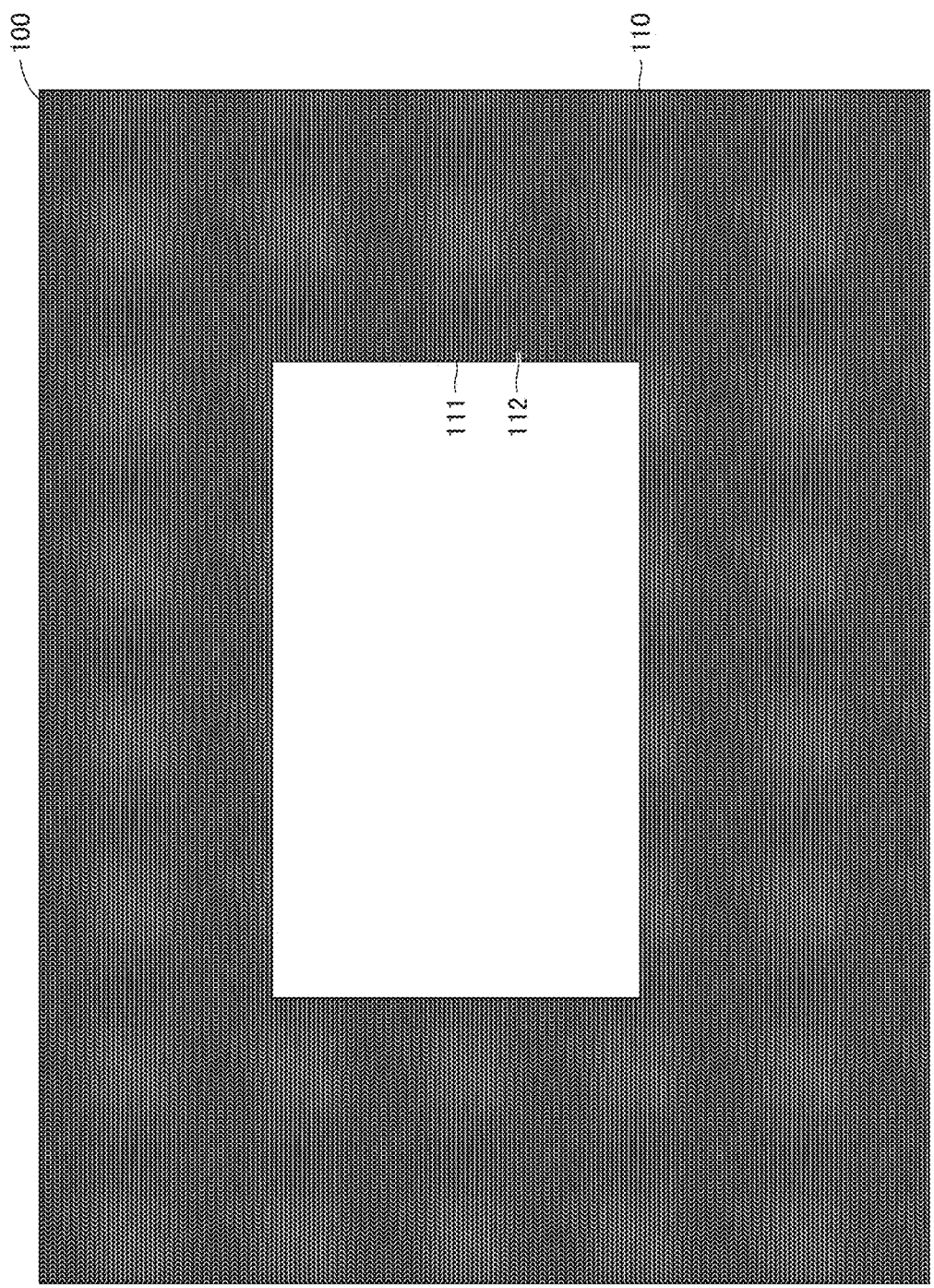
FIG. 2A is a schematic plan view of a first layer of the plastic laminate structure.
Figure 3:
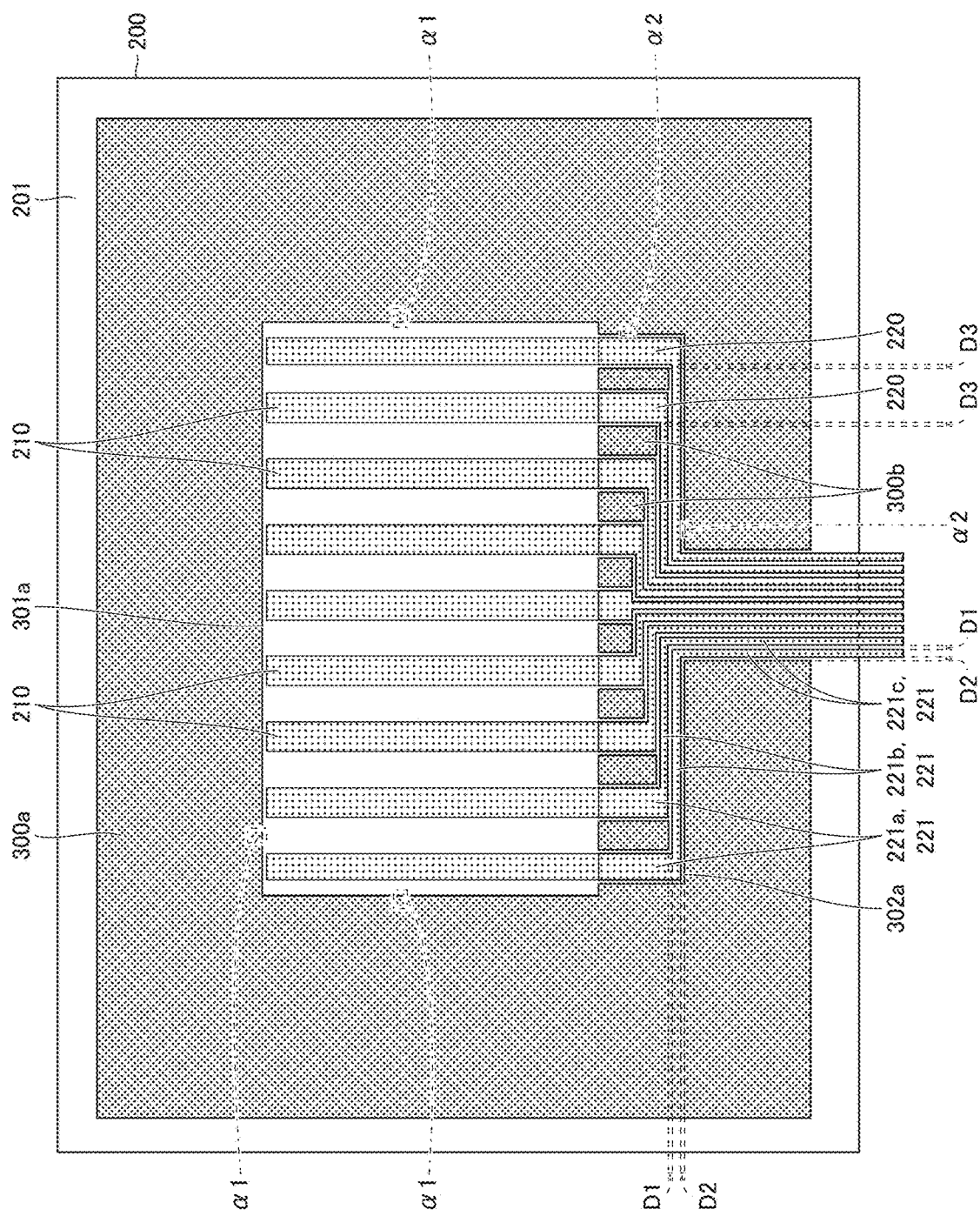
FIG. 3 is a schematic plan view of a second layer of a first variant of the plastic laminate structure of the first embodiment.

The first layer 100 may include a decorative portion 110 as illustrated in FIG. 2A. The decorative portion 110 is formed by decorative printing on the first face 101 or the second face 102 of the first layer 100. The decorative portion 110 includes an opening 111 and a circumferential portion 112 around the opening 111. The area within the opening 111 serves as a viewing area ("VA" for short) of the plastic laminate structure L1. In use, a display device is disposed on the Z'-direction side relative to the plastic laminate structure L1, and a user can see information displayed on the display device from outside through the viewing area, i.e. through the opening 111. It should be noted that FIG. 2A illustrates the decorative portion 110 with a dotted pattern for ease of identification, but such dots are not actual visible or physical dots. The decorative portion 110, not illustrated in FIG. 1A, may actually be provided in some embodiments or may be omitted in other embodiments. Some examples of the display device are liquid crystal displays (LCDs), plasma displays (PDPs), organic electroluminescent displays (OLEDs), digital light processing (DLP) projectors.

The second layer 200 is a plate or film formed of the same or a similar plastic material as the plastic material forming the first layer 100. The second layer 200 is required to be translucent at least partly. For example, the second layer 200 may be partly or entirely transparent. The second layer 200 has a first face 201 and a second face 202 on the opposite side to the first face 201. The first face 201 of the second layer 200 is fixed directly or indirectly to the second face 102 of the first layer 100 in one of the following manners, for example:

1) The first face 201 of the second layer 200 is adhered directly to the second face 102 of the first layer 100 with an adhesive agent or an optical clear adhesive (OCA (registered trademark)) film O as illustrated in FIGS. 1B to 1D.
2) The first face 201 of the second layer 200 is fixed indirectly to the second face 102 of the first layer 100, with a layer, or a plurality of layers laminated in the Z-Z' direction, interposed between the first face 201 of the second layer 200 and the second face 102 of the first layer 100. The fixation between the layers is preferably adhesion using an adhesive agent or the OCA film O. For convenience of description, the one or the plurality of layers between the first face 201 of the second layer 200 and the second face 102 of the first layer 100 may be hereinafter referred to as "at least one other layer."

Figure 2B:
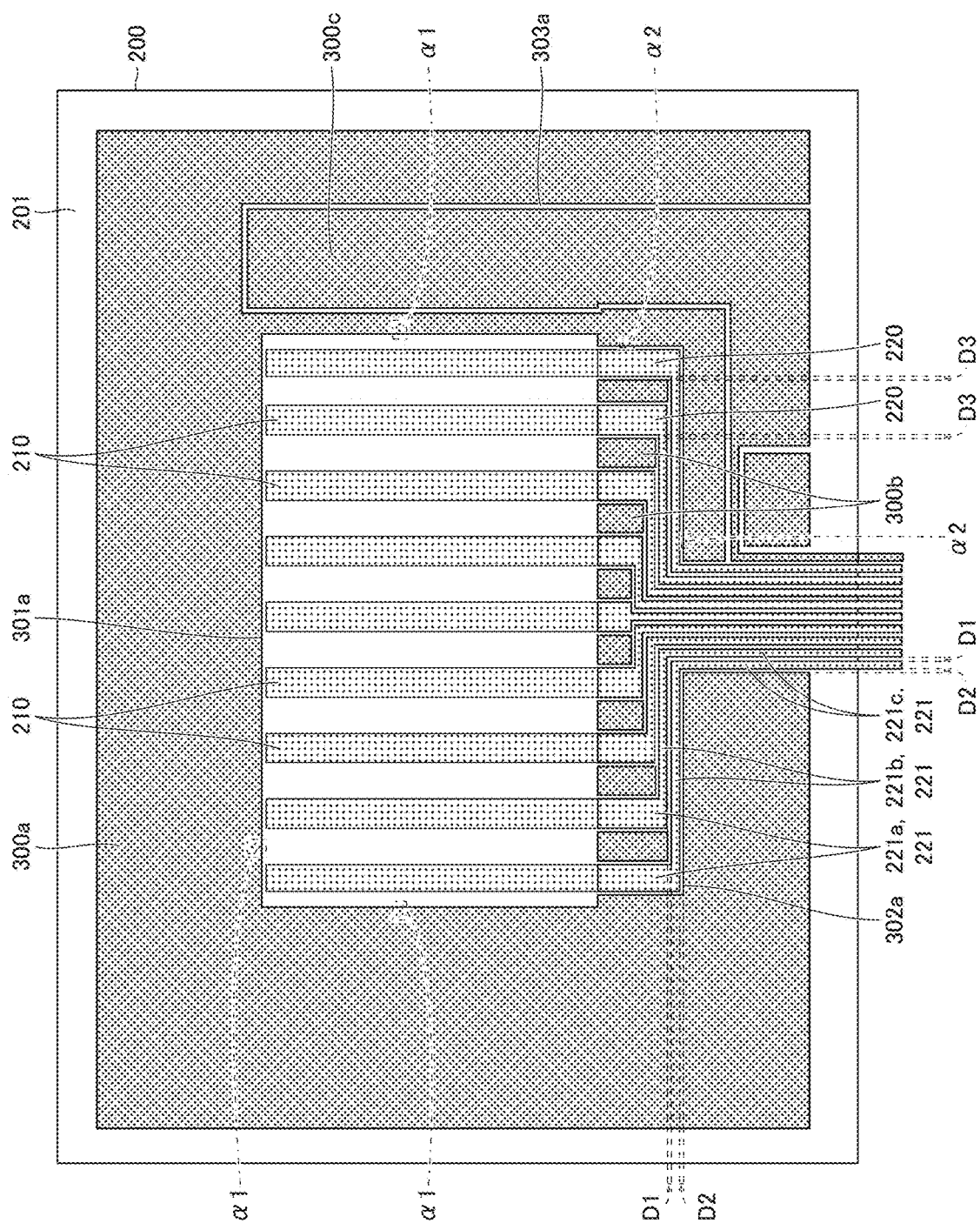
FIG. 2B is a schematic plan view of a second layer of the plastic laminate structure.

The plastic laminate structure L1 further includes a plurality of first electrodes 210 (first functional elements) and a plurality of first conductive lines 220. It should be noted that in FIG. 2B illustrates the first electrodes 210 and the first conductive lines 220 with dotted patterns for ease of identification, but such dots are not actual visible or physical dots.

The first electrodes 210 are transparent conductive films or other conductors, provided at spaced intervals on the first face 201 or the second face 202 (hereinafter referred to as "the one face") of the second layer 200. For example, as illustrated in FIGS. 1A to 1D and 2B, the first electrodes 210 may extend in the Y-Y' direction and be arrayed at spaced intervals in the X-X' direction on the one face. In another aspect, the first electrodes 210 may each have a polygonal or circular shape (not shown) and may be arrayed in a matrix or other arrangement on the one face.

Where the first electrodes 210 are transparent conductive films, they may be formed of, for example, tin-doped indium oxide (ITO), carbon nanotubes (CNT), indium-doped zinc oxide (IZO), aluminum-doped zinc oxide (AZO), conductive polymer such as PEDOT and PSS, or the like. Where the first electrodes 210 are other conductors, they may be formed of, for example, photosensitive silver, silver nanoink, silver nanowires, vapor-deposited copper, rolled copper, copper nanoink, or the like.

The first conductive lines 220 are provided on the one face of the second layer 200 and may be transparent conductive films, metal, metal alloy, or metal wires. The transparent electrode films may be formed of the same or like material as that of the first electrodes 210. The metal may be, for example, silver (Ag), molybdenum (Mo), aluminium (Al), or copper (Cu). The metal alloy may be, for example, silver (Ag) alloy, palladium (Pd) alloy, or copper (Cu) alloy. The first conductive lines 220 are connected to respective ends of the first electrodes 210 (Y'-direction ends as shown in FIGS. 1A and 2B) and extend therefrom to an end of the one face of the second layer 200. The first conductive lines 220 include at least one endmost first conductive line 220 at an end or at the opposite ends of the first conductive line 220 array.

The first conductive lines 220 may each include at least one parallel portion 221 being at least part of the first conductive line 220. The parallel portions 221 are of the first conductive line 220 are arrayed parallel to each other at spaced intervals. In the embodiment of FIG. 2B, each of the first conductive lines 220 includes parallel portions 221a, 221b, and 221c. The parallel portions 221a extend in the Y' direction from the respective first electrode 210 and are arrayed parallel to each other at spaced intervals in the X-X' direction. The parallel portions 221b extend in the X or X' direction from the respective parallel portions 221a and are arrayed parallel to each other at spaced intervals in the Y-Y' direction. The parallel portions 221c extend in the Y' direction from the respective parallel portions 221b and are arrayed parallel to each other at spaced intervals in the X-X' direction.

The plastic laminate structure L1 further includes a first dummy conductor 300a, which is a solid conductor formed of the same, a similar, or a different material from that of the first conductive lines 220. As can be seen from FIG. 1B, the dummy conductor 300a has a thickness in the Z direction which is substantially the same as its adjacent first electrode 210. The first dummy conductor 300a is provided on one of the layers and surrounds the first electrodes 210 and the first conductive lines 220 when viewed from the Z-direction side. For example, as illustrated in FIG. 2B, the first dummy conductor 300a may be provided on the aforementioned one face of the second layer 200 and surrounds the first electrodes 210 and the first conductive lines 220 leaving a clearance therefrom. Alternatively, the first dummy conductor 300a may be provided on one of the layers other than the second layer and surrounds the first electrodes 210 and the first conductive lines 220, with a clearance therefrom, when viewed from the Z-direction side. The thickness of the first dummy conductor 300a may be, but is not required to be, substantially the same as the thickness of each first conductive line 220 and/or each first electrode 210. It should be noted that FIG. 2B illustrates the first dummy conductor 300a with a dotted pattern for ease of identification, but such dots are not actual visible or physical dots.

The first dummy conductor 300a may preferably, but is not required to, have external dimensions corresponding to the design region of the touch sensing device. For example, the first dummy conductor 300a may have external dimensions corresponding to a part of the design region, or alternatively may have the same external dimensions as those of one of the layers. The first dummy conductor 300a shown in FIG. 2B is provided on the first face 201 of the second layer 200 and has external dimensions corresponding to the design region of the touch sensing device. The "design region" of the touch sensing device is herein meant a region of the touch sensing device to which some design is given and which is to be exposed to the outside in use.

The first dummy conductor 300a may have empty regions, namely a first empty region 301a and a second empty region 302a. The first electrodes 210 of one of the aspects described above are arrayed inside the first empty region 301a when viewed from the Z-direction side. The first empty region 301a has external dimensions, and is located at a position, corresponding to the opening 111 (i.e. corresponding to the VA) of the first layer 100. The second empty region 302a extends from the first empty region 301a to an end of the first dummy conductor 300a, opening to the outside of the first dummy conductor 300a. The second empty region 302a communicates with the first empty region 301a. The first conductive lines 220 of one of the aspects described above are arrayed inside the second empty region 302a when viewed from the Z-direction side.

The plastic laminate structure L1 may further include a plurality of second dummy conductors 300b. The second dummy conductors 300b may be formed of the same material as that of the first dummy conductor 300a. The thickness of each second dummy conductor 300b may be, but is not required to be, substantially the same as the thickness of each first conductive line 220 and/or each first electrode 210. It should be noted that FIG. 2B illustrates the second dummy conductors 300b with dotted patterns for ease of identification, but such dots are not actual visible or physical dots. The second dummy conductors 300b are provided on one of the layers and each positioned at least part of the area between two adjacent ones of the first conductive lines 220. In the context of the invention, the term "adjacent" means as follows: (i) two of the same elements arrayed are next to each other, and there is no intervening element of the same kind but may be intervened by an element of other kind; or (ii) a phrase "element A is adjacent to element B" means that element A is next to element B, and there is no other intervening element A or B. The second dummy conductors 300b may have one of the following configurations 1) to 4), for example:

1) As illustrated in FIG. 2B, the second dummy conductors 300b are provided on the aforementioned one face of the second layer 200, and each positioned, leaving clearances, between the parallel portions 221a of each adjacent two of the first conductive lines 220.
2) The second dummy conductors 300b are provided on the aforementioned one face of the second layer 200, and each positioned in the entire region between two adjacent ones of the first conductive lines 220, with a clearance therefrom.
3) The second dummy conductors 300b are provided on a face of one of the layers other than the second layer 200, and each positioned with clearances therefrom, between the parallel portions 221a of two adjacent ones of the first conductive lines 220, when viewed from the Z-direction side.
4) The second dummy conductors 300b are provided on a face of one of the layers other than the second layer 200 and each positioned in the entire region between two adjacent ones of the first conductive lines 220, with clearances therefrom, when viewed from the Z-direction side.

In the context of this description, a "distance D1" or a "first distance" will be understood to mean the distance (shortest distance) in an array direction between adjacent ones of the parallel portions 221 of the first conductive lines 220. More particularly, in the embodiment shown in FIG. 2B, the distance D1 is the distance (shortest distance) in the array direction between adjacent ones of the parallel portions 221b and/or between adjacent ones of the parallel portions 221c. The array direction is the direction in which the parallel portions 221b and 221c are arrayed. In FIG. 2B, the array direction of the parallel portions 221b is the Y-Y' direction, and the array direction of the parallel portions 221c is the X-X' direction.

A "distance D2" or a "second distance" will be understood to mean the distance (shortest distance) in a plane direction between the or each endmost first conductive line 220 and the first dummy conductor 300a. The plane direction is any direction in which the second layer 200 extends.

A "distance D3" or a "third distance" will be understood to mean the distance (shortest distance) in the plane direction between the or each second dummy conductor 300b and one of the first conductive lines 220 that is located next to the same second dummy conductor 300b.

A "distance D4" will be understood to mean the distance in the Z-Z' direction from the first face 101 of the first layer 100 to the first conductive lines 220. The distance D4 is about 500 μm or less.

The plastic laminate structure L1 may preferably have one of the following distance relations A) to C):

A) The distance D1 and the distance D2 may each preferably be 500 μm or less, more preferably 300 μm or less. In this case, the second dummy conductors 300b can be omitted. The distance D1 and the distance D2 may each be smaller than the distance D4.
B) The distance D3 and the distance D2 may each preferably be 500 μm or less, more preferably 300 μm or less. In this case, the parallel portions 221 of the first conductive lines 220 can be omitted. The distance D3 and the distance D2 may each be smaller than the distance D4.
C) The distance D1, the distance D2, and the distance D3 may each preferably be 500 μm or less, more preferably 300 μm or less. The distance D1, the distance D2 and the distance D3 may each be smaller than the distance D4.

The plurality of layers may further include a third layer 400 having a first face 401 and a second face 402 on the opposite side to the first face 401. The third layer 400 may have the same or a similar configuration to that of the second layer 200. The first face 401 of the third layer 400 is fixed directly or indirectly to the second face 202 of the second layer 200, in a similarly manner to the fixation of the second layer 200 to the first layer 100.

Figure 2C:
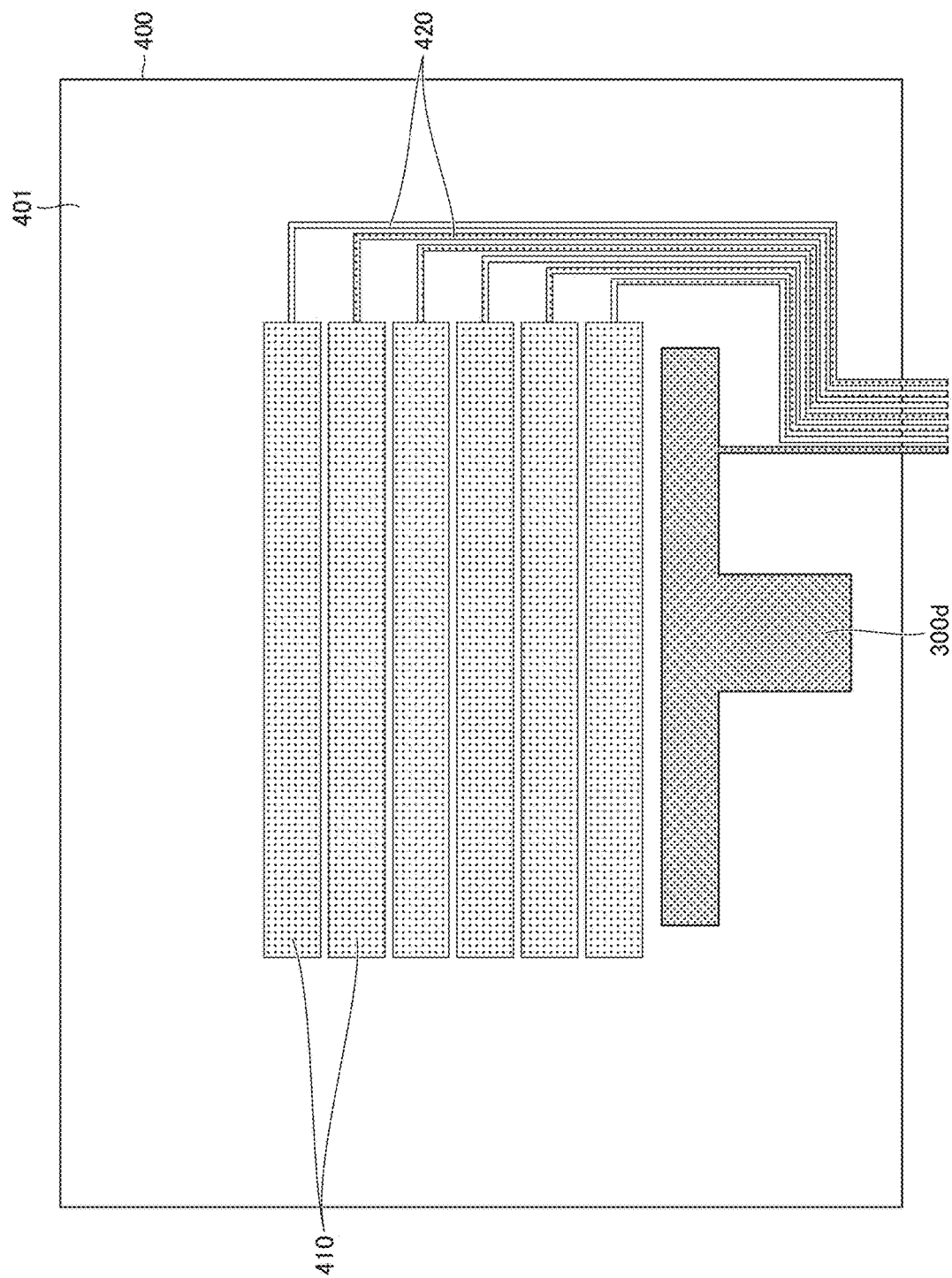
FIG. 2C is a schematic plan view of a third layer of the plastic laminate structure.

The plastic laminate structure L1 may further include a plurality of second electrodes 410 (second functional elements) and a plurality of second conductive lines 420. FIG. 2C illustrates the second electrodes 410 and the second conductive lines 420 with dotted patterns for ease of identification, but such dots are not actual visible or physical dots.

The plurality of second electrodes 410 are transparent conductive films or other conductors, and may have the same or a similar configuration to that of the first electrode 210. More particularly, the second electrodes 410 may have one of the following configurations 1) to 3):

1) As illustrated in FIGS. 1A to 1D and 2C, the second electrodes 410 extend in the X-X' direction on one of the first face 401 and the second face 402 (hereinafter referred to as "the one face") of the third layer 400 so as to cross the first electrodes 210 when viewed from the Z-direction side. The second electrodes 410 are arrayed at spaced intervals in the Y-Y' direction.
2) The second electrodes 410 extend in the X-X' direction on the other face of the first face 201 and the second face 202 of the second layer 200 (i.e. the opposite face to the aforementioned one face of the second layer 200 on which the first electrodes 210 are arrayed) so as to cross the first electrodes 210 when viewed from the Z-direction side. The second electrodes 410 are arrayed at spaced intervals in the Y-Y' direction. The third layer 400 may be omitted.
3) The second electrodes 410 extend in the X-X' direction on the one face of second layer 200 so as to cross the first electrodes 210 when viewed from the Z-direction side. The second electrodes 410 are arrayed at spaced intervals in the Y-Y' direction. It is preferable that an insulation layer (not shown) be interposed directly between the first electrodes 210 and the second electrodes 410. The third layer 400 may be omitted.

The second conductive lines 420 are transparent conductive films, metal, metal alloy, or metal wires, of the same or a similar material to that of the first conductive lines 220. Also, the second conductive lines 420 may be formed of the same, a similar, or a different material from that of the second dummy conductors 300b. The second conductive lines 420 are connected to respective ends of the second electrodes 410 (the X-direction ends as shown in FIGS. 1A and 2C).

Where the second electrodes 410 have configuration 1) above, the second conductive lines 420 are also provided on the aforementioned one face of the third layer 400 and extend from the second electrodes 410 to an end of the one face of the third layer 400.

Where the second electrodes 410 have configuration 2) above, the second conductive lines 420 are also provided on the other face of the second layer 200 and extend from the second electrodes 410 to an end of the other face of the second layer 200.

Where the second electrodes 410 have configuration 3) above, the second conductive lines 420 are also provided on the one face of the second layer 200 and extend from the second electrodes 410 to an end of the one face of the second layer 200.

Where the plastic laminate structure L1 includes the first electrodes 210, but not the second electrodes 410, the plastic laminate structure L1 may have a configuration a) or b) below. In either case, the second conductive lines 420 are also omitted.

a) The plastic laminate structure L1 is a self-capacitive touch sensing device. More particularly, when a detection object approaches one of the first electrodes 210, there arises a change in the electrostatic capacitance between the approached first electrode 210 and the detection object. This capacitance change in turn changes an output signal being outputted from the approached first electrode 210.

b) The plastic laminate structure L1 is a mutual-capacitive touch sensing device. More particularly, the first electrodes 210 includes a plurality of pairs, each pair consisting of two adjacent first electrodes 210. In each pair the two adjacent first electrodes 210, which are capacitively coupled to each other, one of the electrodes serves as a drive electrode, and the other serves as a detection electrode. When a detection object approaches one of the pairs, there arises a change in the electrostatic capacitance between the two first electrodes 210 of the approached pair. This capacitance change in turn changes an output signal being outputted from the detection electrode 210 of the pair.

Where the plastic laminate structure L1 includes both the first electrodes 210 and second electrodes 410, the plastic laminate structure L1 may have a configuration c) or d) below.

c) The plastic laminate structure L1 is a self-capacitive touch sensing device. More particularly, when a detection object approaches one of the first or second electrodes 210 or 410, there arises a change in the electrostatic capacitance between the approached electrode 210 or 410 and the detection object. This capacitance change in turn changes an output signal being outputted from the approached electrode.

d) The plastic laminate structure L1 is a mutual-capacitive touch sensing device. More particularly, the first electrode 210 serve as drive electrodes, and the second electrodes 410 serve as detection electrodes, or vice versa. The first electrodes 210 are capacitively coupled to respective second electrodes 410 at the crossing points. When a detection object approaches one of such coupling points, there arises a change in the electrostatic capacitance at the approached coupling point. This capacitance change in turn changes an output signal being outputted from the detection electrode at the coupling point.

The plastic laminate structure L1 may further include a first ground conductor 300c. In this case, the first dummy conductor 300a may have another empty region, namely a third empty region 303a. It is favorable that the first ground conductor 300c be provided in the third empty region 303a, on the same face of the layer where the first dummy conductor 300a is provided, and positioned on the Z-direction side relative to the second conductive lines 420. In other words, when viewed from the Z-direction side, the first ground conductor 300c covers the second conductive lines 420. In the embodiment shown in FIGS. 1A to 1C and 2B, the first ground conductor 300c is provided in the third empty region 303a on the first face 201 of the second layer 200. The first ground conductor 300c may be formed of the same material as that of the first dummy conductor 300a and is connected to ground. As in a variant shown in FIG. 3, the third empty region 303a and the first ground conductor 300c may be omitted, and the third empty region 303a may preferably be replaced with part of the first dummy conductor 300a.

The plastic laminate structure L1 may further include a second ground conductor 300d. The second ground conductor 300d may be formed of the same material as that of the first dummy conductor 300a and is connected to ground. The second ground conductor 300d may be provided on the aforementioned other face of the second layer 200 so as to be positioned on the Z or Z' direction side relative to the first conductive lines 220, or alternatively on one of the first face 401 or the second face 402 of the third layer 400 so as to be positioned on the Z'-direction side relative to the first conductive lines 220. That is, the second ground conductor 300d covers the first conductive lines 220 when viewed from the Z- or Z'-direction side. In the embodiment shown in FIGS. 1A to 1C and 2C, the second ground conductor 300d is provided on the first face 401 of the third layer 400. The second ground conductor 300d may be omitted.

The plastic laminate structure L1 as described above reduces or prevents the rising phenomenon that the shapes of the first conductive lines 220 are transferred and raised onto the first face 101 of the first layer 100. This is because the first dummy conductor 300a is arranged around the first conductive lines 220 and the first electrodes 210. In addition, the plastic laminate structure L1 is configured to have one of the distance relations A) (the distance D1 and the distance D2), B) (the distance D3 and the distance D2), and C) (distance D1, the distance D2, and the distance D3) as described above, and in any of these cases each distance is very small, particularly 500 μm or less. In any of the distance relations A) to C), where each distance is set to 300 μm or less, it is possible to substantially prevent the rising phenomenon.

Second Embodiment

Figure 4:
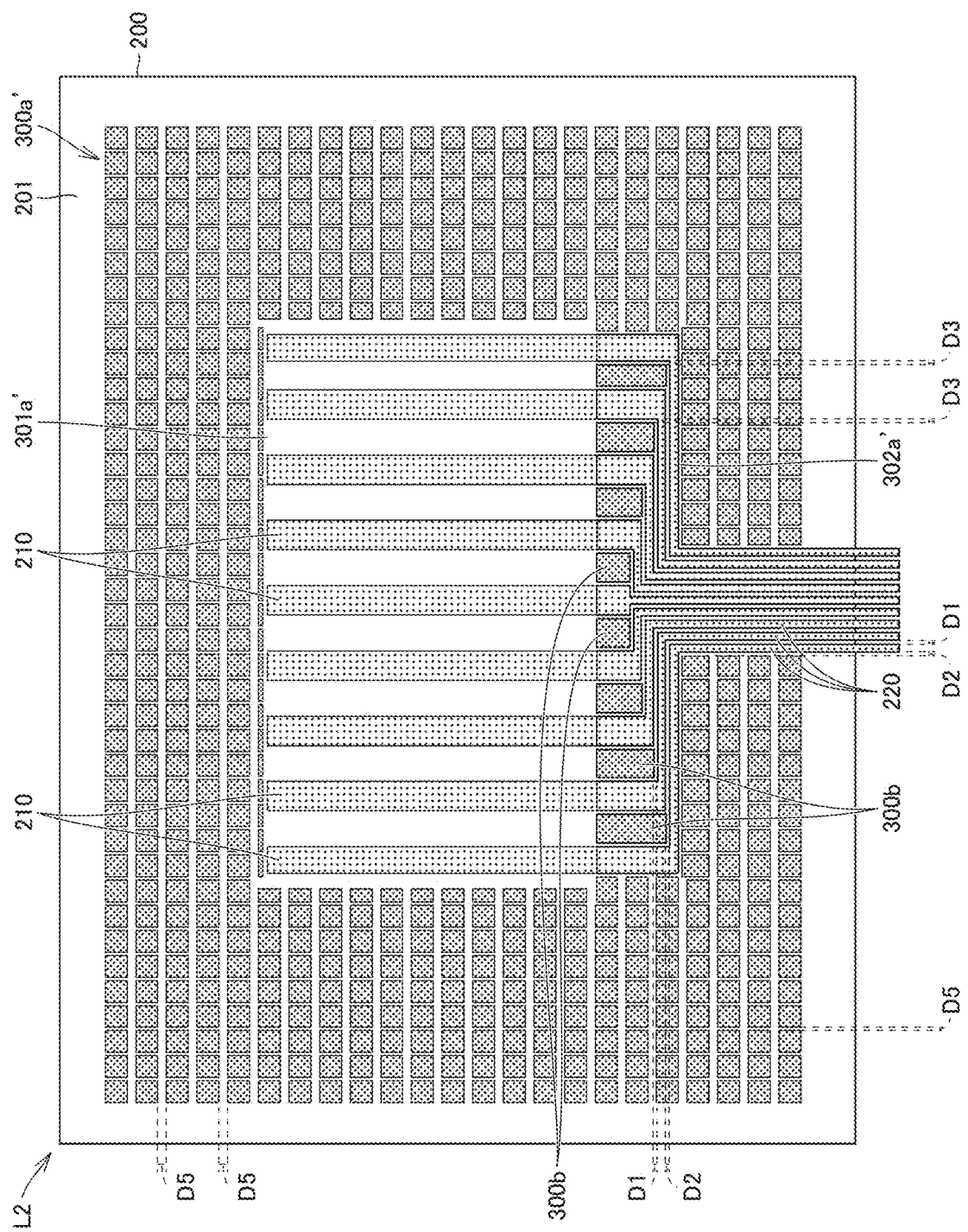
FIG. 4 is a schematic plan view of a second layer of a plastic laminate structure according to the second embodiment of the invention.

A plastic laminate structure L2 according to a plurality of examples including a second embodiment of the invention will now be described with reference to FIG. 4. FIG. 4 illustrates a plastic laminate structure L2 according to the second embodiment. The plastic laminate structure L2 has the same configuration as the plastic laminate structure L1, except that a plurality of first dummy conductors 300a' is provided. The plastic laminate structure L2 will be described focusing on the differences from the plastic laminate structure L1, with overlapping descriptions omitted.

Figure 5:
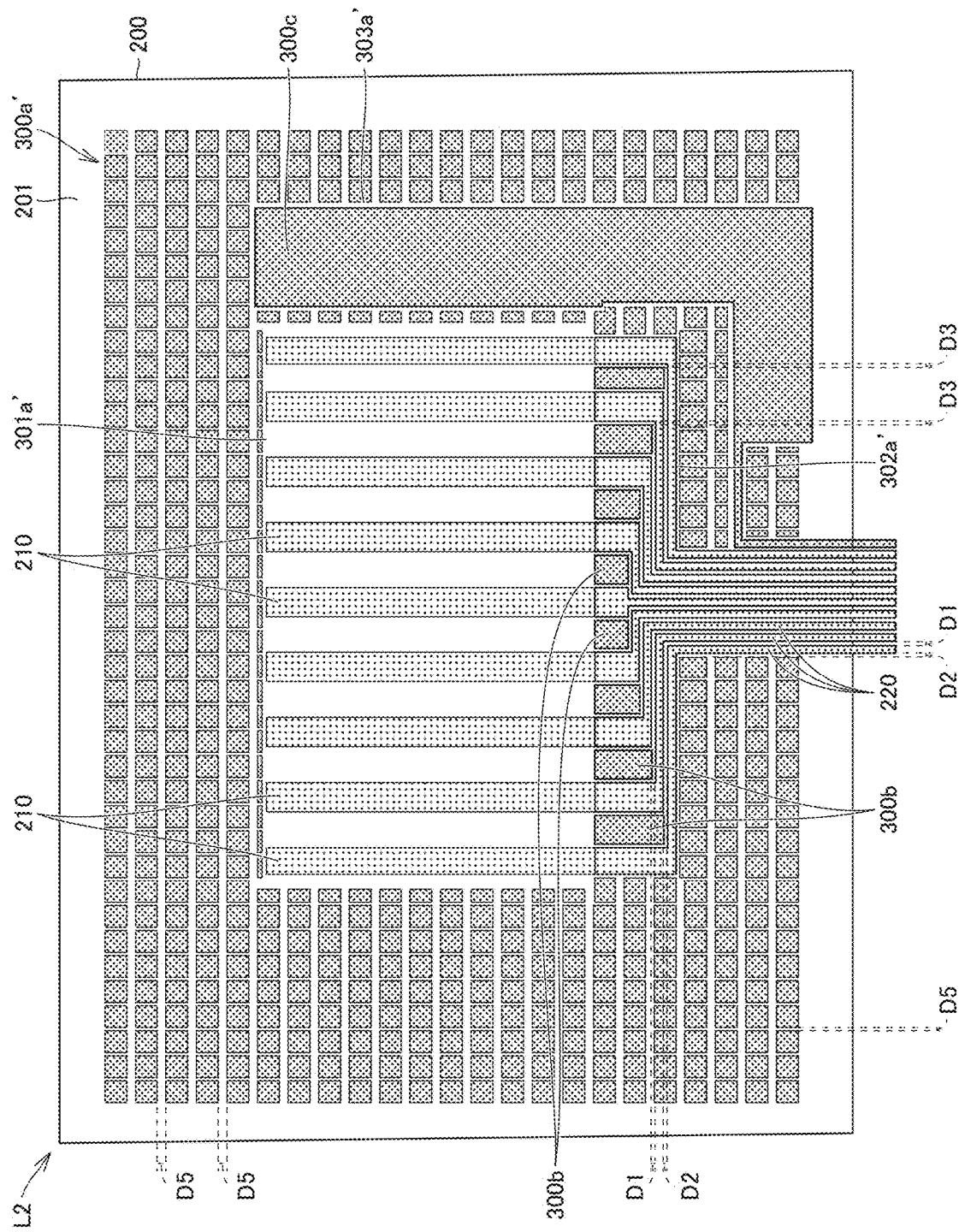
FIG. 5 is a schematic plan view of a variant of the second layer of the plastic laminate structure of the second embodiment.

The first dummy conductors 300a' are formed of the same material as that of the first dummy conductor 300a. The thickness of each first dummy conductor 300a' may be, but is not required to be, substantially the same as the thickness of each first conductive line 220 and/or each first electrode 210. The first dummy conductors 300a' are polygonal or circular and arrayed at spaced intervals on one of the layers. In the embodiment shown in FIG. 4, the first dummy conductors 300a' are rectangular and arrayed at spaced intervals on the first face 201 of the second layer 200. The first dummy conductors 300a' are arranged to define a first empty region 301a' and a second empty region 302a'. The first empty region 301a' and the second empty region 302a' respectively correspond to the first empty region 301a and the second empty region 302a of the plastic laminate structure L1. As in the variant shown in FIG. 5, the first dummy conductors 300a' may be arrayed to further define a third empty region 303a' in addition to the first empty region 301a' and the second empty region 302a'. Similarly to the third empty region 303a, it is preferable that the first ground conductor 300c is provided in the third empty region 303a'. The first dummy conductors 300a' includes a plurality of first dummy conductors 300a' that are located next to the at least one endmost first conductive line 220.

The plastic laminate structure L2 may also have one of the distance relations A) to C) described above for the plastic laminate structure L1. It should be appreciated that the distance D2 (second distance) is the distance in the plane direction between the or each endmost first conductive line 220 and the first dummy conductors 300a that are located next to the same endmost first conductive line 220. In addition, it is preferable that a distance D5 (fourth distance), which is the distance (shortest distance) between adjacent ones of the first dummy conductors 300a', be 500 μm or less, more preferably 300 μm or less. The distance D5 may preferably be smaller than the distance D4.

The plastic laminate structure L2 as described above provides the same or similar technical features and effects as the plastic laminate structure L1. Further, the plastic laminate structure L2 can suppress or prevent unintentional electric coupling of one or more of the first dummy conductors 300a' with the adjacent first conductive line 220 and/or with the adjacent the first electrode 210. Even if one or more of the first dummy conductors 300a' are electrically coupled to the adjacent first conductive line 220 and/or with the first electrode 210, the coupling capacitance is advantageously lowered.

Figure 6:
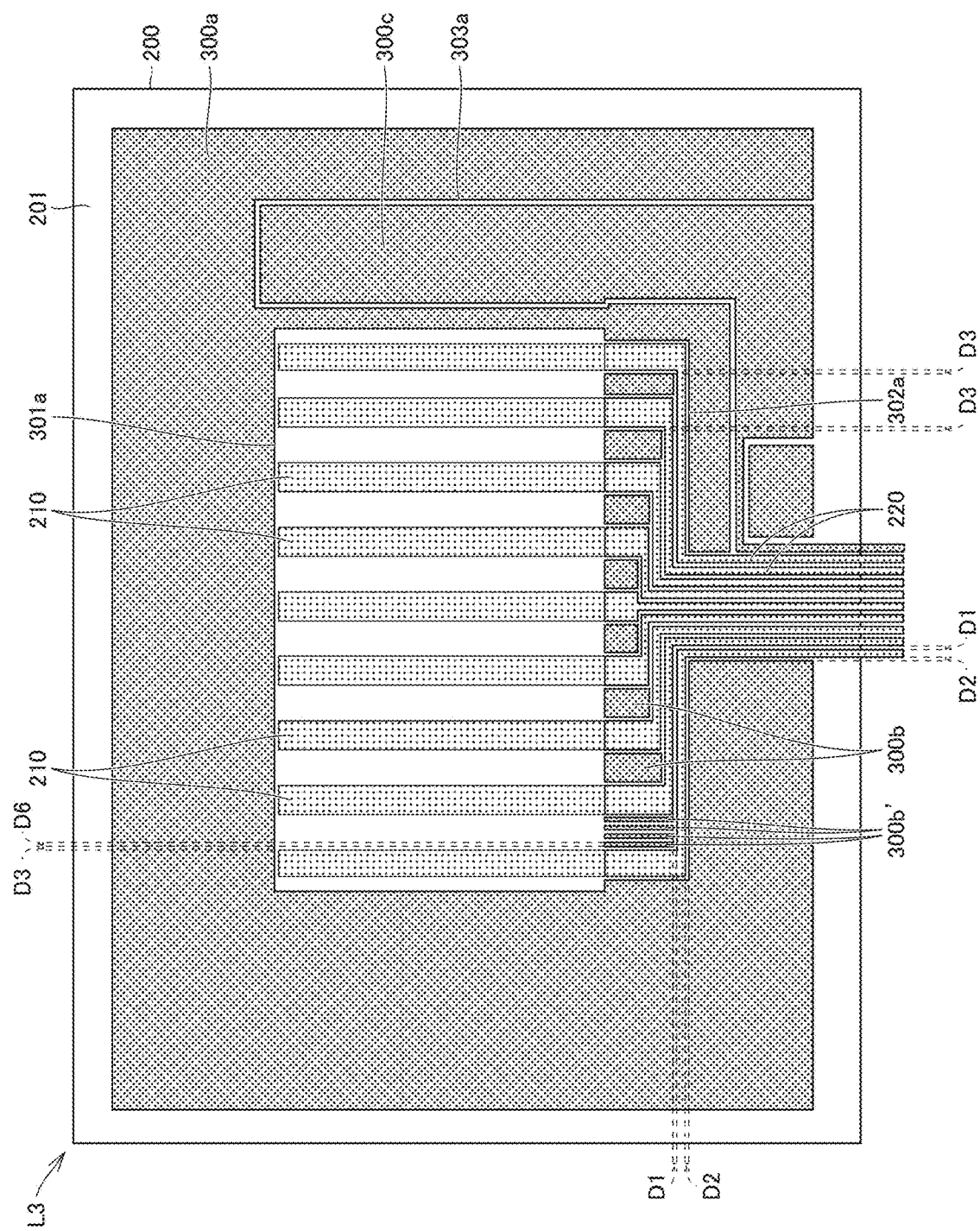
FIG. 6 is a schematic plan view of a second layer of a plastic laminate structure according to the third embodiment of the invention.

Furthermore, since the distance D5 is 500 μm or less, which is very small, the plastic laminate structure L2 reduces or prevents the rising phenomenon that the shapes of the first dummy conductors 300a' are transferred and raised onto the first face 101 of the first layer 100. It is possible to substantially prevents this rising phenomenon where the distance D5 is set to 300 μm or less Third Embodiment A plastic laminate structure L3 according to a plurality of examples including a third embodiment of the invention will now be described with reference to FIG. 6. FIG. 6 illustrates the plastic laminate structure L3 according to the third embodiment. The plastic laminate structure L3 has the same configuration as the plastic laminate structure L1, except that at least one of the second dummy conductors 300b is replaced with a plurality of second dummy conductors 300b'. The plastic laminate structure L3 will be described focusing on the differences from the plastic laminate structure L1, with overlapping descriptions omitted.

The first conductive lines 220 include at least one pair of adjacent first conductive lines 220, namely one and the other first conductive lines 220 of the or each pair. The one first conductive line 220 may preferably be connected to ground, but is not limited thereto.

The second dummy conductors 300b' may be formed of the same material as that of the first dummy conductor 300a. The thickness of each second dummy conductor 300b' may be, but is not required to be, substantially the same as the thickness of each first conductive line 220 and/or each first electrode 210. The second dummy conductors 300b' are provided on one of the of the layers (e.g. on the first face 201 of the second layer 200 as shown in FIG. 6). The second dummy conductors 300b', or each set of a plurality of sets of the second dummy conductors 300b', are positioned in part of the area, or the entire area, between, and in spaced relation to, the one and the other first conductive lines 220 of the corresponding pair. The second dummy conductors 300b' may an elongated shape extending along part of the length (see FIG. 6) or the entire length of the corresponding first conductive line 220 and may be arrayed at spaced intervals in a direction perpendicular to the elongation direction. Alternatively, the second dummy conductors 300b' may be polygonal or circular (not shown) and may be arrayed in a matrix or other arrangement. The second dummy conductors 300b' include endmost second dummy conductors 300b' at the opposite ends of the second dummy conductor 300b' array.

The plastic laminate structure L3 may have one of the distance relations A) to C) described above for the plastic laminate structure L1. It should be noted the distance D3 here is the distance (shortest distance) in the plane direction between the or each second dummy conductor 300b and one of the first conductive lines 220 that is located next to the same second dummy conductor 300b, and also the distance (shortest distance) in the plane direction between the endmost second dummy conductor 300b' (or the endmost second dummy conductor 300b' of each of the plurality of sets of the second dummy conductors 300b') and one of the first conductive lines 220 that is located next to the same endmost second dummy conductors 300b'. Also, it is preferable that a distance D6 (fifth distance) be 500 μm or less, more preferably 300 μm or less. The distance D6 is the distance (shortest distance) between adjacent ones of the second dummy conductors 300b'. It is also preferable that the distance D3 and the distance D6 be each smaller than the distance D4.

The plastic laminate structure L3 as described above provides the same or similar technical features and effects as the plastic laminate structure L1. In addition, the plastic laminate structure L3 suppresses or prevents unintentional electric coupling between the second dummy conductors 300b' and the adjacent first conductive lines 220. The coupling capacitance is advantageously lowered even if the second dummy conductors 300b' are electrically coupled to the adjacent first conductive lines 220. More particularly, in a plastic laminate structure where the one first conductive line 220 of the or each pair of adjacent first conductive lines 220 is a ground line adjacent to a second dummy conductor 300b, because of the extremely small distance D3 of 500 μm or less, the other first conductive line 220 of the pair may be electrically coupled to the one first conductive line 220 via the second dummy conductor 300b to cause migration. This is in contrast with the plastic laminate structure L3, in which the second dummy conductors 300b', or each set of a plurality of sets of the second dummy conductors 300b', are positioned at spaced intervals between the one and the other first conductive lines 220 of the corresponding pair. This arrangement suppresses or prevents unintentional electrical coupling between the one and the other first conductive lines 220 via the second dummy conductors 300b'. This should result in suppression or prevention of the migration described above.

Since each of the distances D3 and D6 of 500 μm or less is extremely small, the plastic laminate structure L3 also reduces or prevents the rising phenomenon that the shapes of the second dummy conductors 300b' are transferred and raised onto the first face 101 of the first layer 100. This rising phenomenon can be substantially prevented by setting each of the distances D3 and D6 to 300 μm or less.

It should be appreciated that the plastic laminate structure L2 may modified such that at least one of the second dummy conductors 300b is replaced with a plurality of second dummy conductors 300b' in a similar manner to the plastic laminate structure L3. In such modified plastic laminate structure L2, the distances D3 are D6 are defined in a similar manner to those of the plastic laminate structure L3.

It should be noted that the plastic laminate structures described above are not limited to the aforementioned embodiments, but may be modified in any manner within the scope of the claims.

The plastic laminate structure of the invention is not limited to a capacitive touch sensing device. Some examples of the plastic laminate structure of the invention are resistive touch sensing devices, display devices, power-generating devices, communications modules, sensor modules, or the like.

Where the plastic laminate structure of the invention is a resistive touch sensing device, it is preferable that the first electrodes 210 and second electrodes 410 of any of the aspects described below serve as electrodes (first functional element) for resistive touch sensing, and that spacer dots are interposed between the second layer 200 and the third layer 400. Such modified plastic laminate structure may otherwise be configured as described for the above embodiments.

Where the plastic laminate structure of the invention is a display device, such as a liquid crystal display (LCD) or an organic electroluminescent display (OLED), it is preferable that the first electrodes 210 and second electrodes 410 of any of the aspects described above serve as electrodes of a display part of the display device. In the case of an LCD, it is preferable that the second layer 200 be a liquid crystal layer located between the first electrodes 210 and the second electrodes 410. In the case of an OLED, it is preferable that the second layer 200 and the third layer 400 respectively serve as an electron transport layer and a hole transport layer, or vice versa, and that a light emitting layer be interposed therebetween. Such modified plastic laminate structure may otherwise be configured as described for the above embodiments.

Where the plastic laminate structure of the invention is an power-generating device, a solar cell for example, electrodes for the solar cell may preferably be the first electrodes 210 disposed on the first face 201 of the second layer 200 and the second electrodes 410 disposed on the second face 402 of the third layer 400, so that the second layer 200 and the third layer 400 respectively serve as N- and P-type silicon semiconductors or vice versa. Such modified plastic laminate structure may otherwise be configured as described for the above embodiments.

When the plastic laminate structure of the invention is a communication module, it is preferable that the first electrodes 210 described above be replaced with at least one antenna. In this case, the at least one antenna may preferably be connected to one or more first conductive lines 220. In this case, it is possible to omit the third layer 400, the second electrodes 410, and the second conductive lines 420, or to replace the second electrodes 410 described above with at least one additional antenna. In the latter case, the at least one additional antenna may preferably be connected to one or more second conductive lines 420. Such modified plastic laminate structure may otherwise be configured as described for the above embodiments.

Where the plastic laminate structure of the invention is a sensor module, it is preferable that the first electrodes 210 described above be replaced with at least one sensor (first functional element), such as a light emitting element, a light receiving element, a gyroscope, or an acceleration sensor. The at least one sensor may preferably be connected to one or more first conductive lines 220. In this case, the third layer 400, the second electrodes 410, and the second conductive lines 420 are omitted. Such modified plastic laminate structure may otherwise be configured as described for the above embodiments.

As described above, the invention requires at least one first functional element, which or each of which may be an electrode, a display element, an antenna, or a sensor. The first functional element of the invention may be any element or elements that are electrically connectable to the at least one first conductive line so as to function when energized or electrically function when under some influence from outside.

The first dummy conductor 300a of the invention may include a body 310a and a plurality of mini-conductors 320a. The mini-conductors 320a are arranged between the body 310a and the at least one first functional element of one of the above aspects, and/or between the body 310a and the first conductive lines of one of the above aspects. The mini-conductors 320a are arranged or configured at a gradually reduced density from the end of the body 310a toward the at least one first functional element and/or the first conductive lines. Some of the mini-conductors 320a (some mini-conductors 320a) that are located in the vicinity of the body 310a are integrated with the body 310a.

The first dummy conductor 300a is applicable to any of the plastic laminate structures L1 to L3, irrespective of whether the distance relations A) to C) described above is established. In this case, the first dummy conductor 300a may be arranged as follows.

The mini-conductors 320a surround the first empty region 301a and/or the second empty region 302a, i.e. surround the first electrodes 210 and/or the first conductive lines 220. (The first and/or second empty regions surrounded by the mini-conductors 320a will be hereinafter referred to as a "surrounded empty region.") In other words, the mini-conductors 320a are positioned between the surrounded empty region and the body 310a to form the edge of the surrounded empty region. The body 310a is a part of the first dummy conductor 300a excluding the mini-conductors 320a. Where the decorative portion 110 is provided on the second face 102 of the first layer 100, the mini-conductors 320a that define the first empty region 301a may preferably be arranged below the circumferential portion 112 of the decorative portion 110 (i.e., on the Z'-direction side relative to the circumferential portion 112).

Figure 7A:
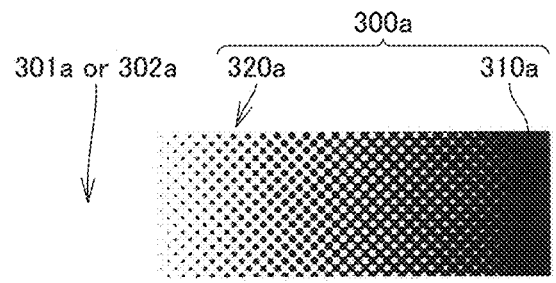
FIG. 7A is a schematic enlarged view of a portion α1 and/or α2 in FIG. 2B or 3, illustrating the first dummy conductor according to a second variant of the plastic laminate structure of the first embodiment.

The mini-conductors 320a may be configured as shown in FIGS. 7A to 7D, for example. As shown in FIG. 7A, the mini-conductors 320a may be arranged in dot pattern between the body 310a and the surrounded empty region (i.e., between the body 310a and the first electrodes 210, and/or between the body 310a and the first conductive lines 220). In this case, the mini-conductors 320a have external sizes gradually increasing with increasing distance from the surrounded empty region (i.e., the mini-conductors 320a are arranged at a gradually reduced density from the end of the body 310a toward to the surrounded-empty-region side (toward the first electrodes 210 and/or the first conductive lines 220). Some of the mini-conductors 320a that are located in the vicinity of the body 310a are integrated with the body 310a.

Figure 7B:
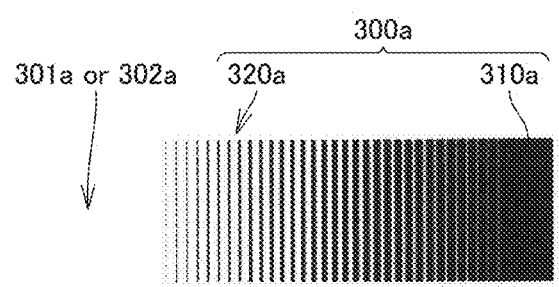
FIG. 7B is a schematic enlarged view of a portion α1 and/or α2 in FIG. 2B or 3, illustrating the first dummy conductor according to a third variant of the plastic laminate structure of the first embodiment.

As shown in FIG. 7B, the mini-conductors 320a may be arranged at spaced intervals between the body 310a and the surrounded empty region (i.e., between the body 310a and the first electrodes 210, and/or between the body 310a and the first conductive lines 220). The mini-conductors 320a have elongated shapes extending perpendicularly to the array direction of the mini-conductors 320a. The mini-conductors 320a have dimensions in the array direction gradually increasing with increasing distance from the surrounded empty region (i.e., the mini-conductors 320a are arranged at a gradually reduced density from the end of the body 310a toward to the surrounded-empty-region side (toward the first electrodes 210 and/or the first conductive lines 220). One or more of the mini-conductors 320a that are located in the vicinity of the body 310a are integrated with the body 310a.

Figure 7C:
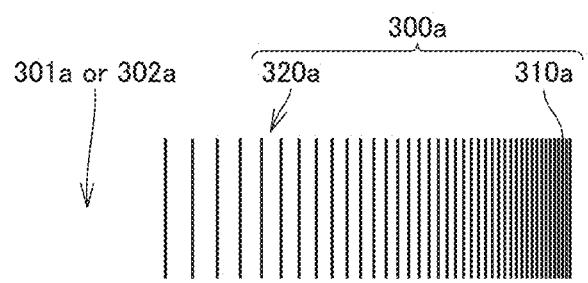
FIG. 7C is a schematic enlarged view of a portion α1 and/or α2 in FIG. 2B or 3, illustrating the first dummy conductor according to a fourth variant of the plastic laminate structure of the first embodiment.

A variant as shown in FIG. 7C have a similar configuration to a variant shown in FIG. 7B, but is different in the following respects. The mini-conductors 320a have the same dimension in the array direction but are arranged at gradually decreasing spaced intervals in the array direction with increasing distance from the surrounded empty region (i.e., the mini-conductors 320a are arranged at a gradually reduced density from the end of the body 310a toward to the surrounded-empty-region side (toward the first electrodes 210 and/or the first conductive lines 220).

Where the first dummy conductor 300a is configured as shown one of FIGS. 7A to 7C, such variant of the plastic laminate structure reduces or prevents the rising phenomenon that the shapes of the first conductive lines 220 are transferred and raised onto the first face 101 of the first layer 100, and also the rising phenomenon that the shape of the end at the surrounded-empty-region side of the first dummy conductor 300a is transferred and raised onto the first face 101 of the first layer 100. In the endmost one(s) of the mini-conductors 320a, which is positioned closest to the first empty region 301a, the end(s) at the first empty region 301a side may, but is not required to, substantially coincide, along the Z-Z' direction, with the boundary between the opening 111 and the circumferential portion 112 of the decorative portion 110 (i.e. the edge of the viewing area (VA) described above). Even where the end(s) at the first empty region 301a side does not coincide with, or is slightly displaced with respect to, the edge of the VA, it will be difficult for a user to visually recognize the presence of the mini-conductors 320a lying outside the edge of the VA. This is because, as described above, the mini-conductors 320a are arranged at a gradually reduced density from the end of the body 310a toward the surrounded empty region. For this reason, the above variants of the plastic laminate structure are configured such as to facilitate alignment of the edge of the VA with the end of the mini-conductors 320a that define the first empty region 301a when the first layer 100 having the decorative portion 110 is bonded, or laminated via the at least one other layer, to the layer having the first dummy conductor 300a. It should be appreciated that in an embodiment as shown in FIG. 7A, there is provided a plurality of endmost mini-conductors 320a, which are located closest to the first empty region 301a and arrayed in a line along the first empty region 301a. In an embodiment as shown in FIG. 7B or 7C, there is provided a single endmost mini-conductor 320a positioned closest to the first empty region 301a.

Figure 7D:
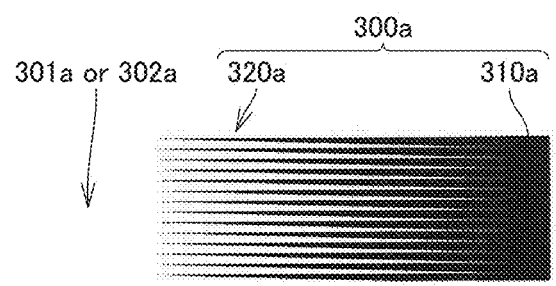
FIG. 7D is a schematic enlarged view of a portion α1 and/or α2 in FIG. 2B or 3, illustrating the first dummy conductor according to a fifth variant of the plastic laminate structure of the first embodiment.

As shown in FIG. 7D, the mini-conductors 320a may be shaped like comb teeth extending from the end of the body 310a to the surrounded empty region (i.e., toward the first electrodes 210 and/or the first conductive lines 220). The mini-conductors 320a, or the teeth, gradually taper from the end of the body 310a to the surrounded empty region (i.e., the mini-conductors 320a are arranged at a gradually reduced density from the end of the body 310a toward to the surrounded-empty-region side (toward the first electrodes 210 and/or the first conductive lines 220)). This variant of the plastic laminate structure reduces or prevents the rising phenomenon that the shapes of the first conductive lines 220 are transferred and raised onto the first face 101 of the first layer 100, and also the rising phenomenon that the shape of the end at the surrounded-empty-region side of the first dummy conductor 300a is transferred and raised onto the first face 101 of the first layer 100. The tips (the ends at the surrounded-empty-region side) of the mini-conductors 320a may, but are not required to, substantially coincide, along the Z-Z' direction, with the boundary between the opening 111 and the circumferential portion 112 of the decorative portion 110 (i.e. the edge of the viewing area (VA) described above). Even where the tips at the surrounded-empty-region side of the mini-conductors 320a do not coincide with, or are slightly displaced with respect to, the edge of the VA, it will be difficult for a user to visually recognize the presence of the tips of the mini-conductors 320a lying outside the edge of the VA. This is because, as described above, the mini-conductors 320a are arranged at a gradually reduced density from the end of the body 310a toward the surrounded empty region. For this reason, the above variants of the plastic laminate structure are configured such as to facilitate alignment of the edge of the VA with the end of the mini-conductors 320a that define the first empty region 301a when the first layer 100 having the decorative portion 110 is bonded, or laminated via the at least one other layer, to the layer having the first dummy conductor 300a.

Where the first dummy conductors 300a' is provided, the one or ones of them that are located closest to the surrounded empty region, namely the first empty region 301a' and/or the second empty region 302a', may each include the body 310a and the mini-conductors 320a of one of the above aspects.

The or each second dummy conductor 300b of the invention may also include a body 310a and mini-conductors 320a that are similar to, but different in the following respects from, the body 310a and mini-conductors 320a of the first dummy conductors 300a of one of the above aspects.

The mini-conductors 320a of the or each second dummy conductor 300b include a first set of mini-conductors 320a, which are provided near one of the adjacent two first conductive lines 220, and a second set of mini-conductors 320a, which are provided near the other of the adjacent two first conductive lines 220. The body 310a of the or each second dummy conductor 300b is provided between these two sets of mini-conductors 320a, namely between the first set of mini-conductors 320a near one of the adjacent two first conductive lines 220 and the second set of mini-conductors 320a near the other of the adjacent two first conductive lines 220. More particularly, where the mini-conductors 320a are configured as illustrated in FIG. 7A, each set of mini-conductors 320a may preferably have external sizes gradually increasing with increasing distance from each adjacent first conductive line 220. Where the mini-conductors 320a are configured as illustrated in FIG. 7B, each set of mini-conductors 320a may preferably have dimensions in the array direction gradually increasing with increasing distance from each adjacent first conductive line 220. Where the mini-conductors 320a are configured as illustrated in FIG. 7C, each set of mini-conductors 320a may preferably be arranged at gradually decreasing spaced intervals in the array direction with increasing distance from each adjacent first conductive line 220. Where the mini-conductors 320a are configured as illustrated in FIG. 7D, each set of mini-conductors 320a are shaped like comb teeth extending from the end of the body 310a to each adjacent first conductive line 220. Each set of mini-conductors 320a, or each set of teeth, gradually taper from each end of the body 310a to each adjacent first conductive line 220. With the second dummy conductors 300b having any of the above configurations, the plastic laminate structure reduces or prevents the rising phenomenon that the shapes of the first conductive lines 220 are transferred and raised onto the first face 101 of the first layer 100, and also the rising phenomenon that the shape of the or each second dummy conductor 300b, particularly the shape of its end at the side of the adjacent first conductive line 220, is transferred and raised onto the first face 101 of the first layer 100. It should be noted that any of the above configurations of the second dummy conductors 300b is applicable to any plastic laminate structure of the invention, irrespective of whether the distance relations A) to C) described above is established.

The plastic laminate structure of the invention includes at least one first dummy conductor and/or at least one second dummy conductor. The at least one first dummy conductor and/or the at least one second dummy conductor of the invention may be electrically insulated from the first electrodes and the first conductive lines. The at least one first dummy conductor and/or the at least one second dummy conductor of the invention may be grounded, or alternatively subjected to fixed or dynamic voltage. The at least one first dummy conductor of the invention may or may not be formed on a single one of the layers, which may be the second layer. Where a plurality of first dummy conductors is provided, at least one of them may be formed on one of the layers, the other one or at least another one may be formed on another one of the layers. Likewise, the at least one second dummy conductor of the invention may or may not be formed on a single one of the layers, which may be the second layer. Where a plurality of second dummy conductors is provided, at least one of them may be formed on one of the layers, the other one or at least another one may be formed on another one of the layers.

As described above, the first distance of the invention is 500 µm or less. This distance may be established by enlarging at least part of each first conductive line. The design region of the touch sensing device may be filled with the first conductive lines by enlarging at least part of each first conductive line. In this case, the first conductive lines, rather than the first dummy conductor, suppresses or prevents the rising phenomenon, making it possible to omit the first dummy conductor.

The other layers than the first layer 100 and the second layer 200 may each be a functional layer (e.g., an anti-glare layer, an anti-Newton layer, a low-reflective layer, self-repair layer, antimicrobial layer and/or an anti-static layer), or may be a dummy layer.

The plastic laminate structure of the invention is not limited to have a flat shape as described for the above embodiments. For example, the plastic laminate structure may be entirely or partly curved to have a curved face.

It should be appreciated that the materials, the shapes, the dimensions, the number, the positions, etc. of the elements of the plastic laminate structures in the above-described embodiments and their variants are presented by way of example only and can be modified in any manner as long as the same functions can be fulfilled. The aspects and variants of the above-described embodiments can be combined in any possible manner. It should be noted that the lamination direction (Z-Z' direction) of the invention may be any direction in which the layers of the invention are laminated. The X-X' direction of the invention may be any direction that crosses the lamination direction. The Y-Y' direction of the invention may be any direction that crosses the lamination direction and the X-X' direction and that is not located on the plane on which the lamination direction and the X-X' direction extend.

REFERENCE SIGNS LIST

L1 to L3: plastic laminate structure
100: first layer
101: first face
102: second face
110: decorative portion
111: opening
200: second layer
201: first face
202: second face
210: first electrode (first functional element)
220: first conductive line
221 (221a to 221c): parallel portion
300a, 300a': first dummy conductor
301a, 301a': first empty region
302a, 302a': second empty region
300b, 300b': second dummy conductor
300c: first ground conductor
300d: second ground conductor
400: third layer
401: first face
402: second face
410: second electrode (second functional element)
420: second conductive line
D1: distance (first distance)
D2: distance (second distance)
D3: distance (third distance)
D4: distance
D5: distance (fourth distance)
D6: distance (fifth distance)
O: OCA film

The invention claimed is:
1. A plastic laminate structure comprising:
a plurality of layers laminated together, including a first layer of a plastic material and a second layer, the first layer having a first face and a second face on an opposite side to the first face, the second layer being fixed directly or indirectly to the second face of the first layer;

at least one first functional element on the second layer, the or each first functional element being an electrode, a display element, an antenna, or a sensor;

a plurality of first conductive lines provided on the second layer and out of contact with each other. at least one of the first conductive lines being connected to the at least one first functional element, the first conductive lines including an endmost first conductive line being an endmost one of the first conductive lines, each of the first conductive lines including a parallel portion forming at least part of the each first conductive line, the parallel portions of the first conductive lines being arrayed in an array direction in spaced and parallel relation to each other; and at least one first dummy conductor being provided on one of the layers and surrounding the at least one first functional element and the first conductive lines, wherein the at least one first dummy conductor has empty regions that include a first empty region and a second empty region, the at least one first functional element is disposed inside the first empty region when viewed from one side in a first direction, and the first conductive s are disposed inside the second empty region when viewed from the one side in the first direction, wherein the first direction is a lamination direction in which the plurality of layers is laminated together, a first distance and a second distance are each 50 μm or less, where the first distance is a distance in the array direction between adjacent ones of the parallel portions of the first conductive lines, and the second distance is a distance in a plane direction between the endmost first conductive line and an end of the second empty region of the at least one first dummy conductor, the plane direction extending along a face of the second layer.

2. The plastic laminate structure according to claim 1 further including at least one second dummy conductor, the or each second dummy conductor being provided on one of the layers and positioned at least part of a corresponding area between adjacent ones of the first conductive lines, a third distance is 500 μm or less, where the third distance is a distance in the plane direction between the or each second dummy conductor and one of the first conductive lines that is located next to said second dummy conductor.

3. A plastic laminate structure comprising:

a plurality of layers laminated together, including a first layer of a plastic material and a second layer, the first layer having a first face and a second face on an opposite side to the first face, the second layer being fixed directly or indirectly to the second face of the first layer;

at least one first functional element on the second layer, the or each first functional element being an electrode, a display element, an antenna, or a sensor;

a plurality of first conductive lines provided on the second layer and out of contact with each other, at least one of the first conductive lines being connected to the at least one first functional element, the first conductive lines including an endmost first conductive line being an endmost one of the first conductive lines;

at least one first dummy conductor being provided on one of the layers and surrounding the at least one first functional element and the first conductive lines; and at least one second dummy conductor being provided on one of the layers, the or each second dummy conductor being positioned at least part of a corresponding area between adjacent ones of the first conductive lines, wherein the at least one first dummy conductor has empty regions that include a first empty region and a second empty region, the at least one first functional element is disposed inside the first empty region when viewed from one side in a first direction, and the first conductive lines are disposed inside the second empty region when viewed from the one side in the first direction, wherein the first direction is a lamination direction in which the plurality of layers is laminated together, a second distance and a third distance are each 500 μm or less, where the second distance is a distance in a plane direction between the end most first conductive line and an end of the second empty region of the at least one first dummy condo the third distance is a distance in the plane direction between the or each second dummy conductor and one of the first conductive lines that is next to said second dummy conductor, and the plane direction extends along a face of the second layer.

4. The plastic laminate structure according to claim 1, wherein the at least one first dummy conductor comprises a plurality of first dummy conductors arrayed at spaced intervals on one of the layers, and a fourth distance is 500 μm or less, where the fourth distance is a distance between adjacent ones of the first dummy conductors.

5. The plastic laminate structure according to claim 3, wherein the at least one first dummy conductor comprises a plurality of first dummy conductors arrayed at spaced intervals on one of the layers, and a fourth distance is 500 μm or less, where the fourth distance is a distance between adjacent ones of the first dummy conductors.

6. The plastic laminate structure according to claim 1, wherein the at least one first dummy conductor comprises a plurality of first dummy conductors arrayed at spaced intervals on one of the layers, and the second distance is a distance in the plane direction between the endmost first conductive line and ones of the first dummy conductors that are located next to the endmost first conductive line.

7. The plastic laminate structure according to claim 3, wherein the at least one first dummy conductor comprises a plurality of first dummy conductors arrayed at spaced intervals on one of the layers, and the second distance is a distance in the plane direction between the endmost first conductive line and ones of the first dummy conductors that are located next to the endmost first conductive.

8. The plastic laminate structure according to claim 1, wherein the at least one first dummy conductor comprises a plurality of first dummy conductors, at least one of the first dummy conductors is provided on the second layer, and at least another one of the first dummy conductors is provided on one of the layers other than the second layer.

9. The plastic laminate structure according to claim 3, wherein the at least one first dummy conductor comprises a plurality of first dummy conductors, at least one of the first dummy conductors is provided on the second layer, and at least another one of the first dummy conductors is provided on one of the layers other than the second layer.

10. The plastic laminate structure according to claim 2, wherein
the first conductive lines include at least one pair of adjacent first conductive lines, the or each pair of adjacent first conductive lines including one and the other first conductive lines,
the at least one second dummy conductor comprises a plurality of second dummy conductors,
the second dummy conductors, or some of the second dummy conductors, are positioned at spaced intervals between the one and the other first conductive lines of the corresponding pair, and
a fifth distance is 500 µm or less, where the fifth distance is a distance between adjacent ones of the second dummy conductors.

11. The plastic laminate structure according to claim 3, wherein
the first conductive lines include at least one pair of adjacent first conductive lines, the or each pair of adjacent first conductive lines including one and the other first conductive lines,
the at least one second dummy conductor comprises a plurality of second dummy conductors,
the second dummy conductors, or some of the second dummy conductors, are positioned at spaced intervals between the one and the other first conductive lines of the corresponding pair, and
a fifth distance is 500 µm or less, where the fifth distance is a distance between adjacent ones of the second dummy conductors.

12. A plastic laminate structure comprising:
a plurality of layers laminated together, including a first layer of a plastic material and a second layer, the first layer having a first face and a second face on an opposite side to the first face, the second layer being fixed directly or indirectly to the second face of the first layer;
at least one first functional element on the second layer, the or each first functional element being an electrode, a display element, an antenna, or a sensor;
a plurality of first conductive lines provided on the second layer, at least one of the first conductive lines being connected to the at least one first functional element, the first conductive lines including an endmost first conductive line being an endmost one of the first conductive lines, each of the first conductive lines including a parallel portion forming at least part of the each first conductive line, the parallel portions of the first conductive lines being arrayed in an array direction in spaced and parallel relation to each other; and
at least one first dummy conductor being provided on one of the layers and surrounding the at least one first functional element and the first conductive lines, wherein
a first distance and a second distance are each 500 µm or less, where
the first distance is a distance in the array direction between adjacent ones of the parallel portions of the first conductive lines, and
the second distance is a distance in a plane direction between the endmost first conductive line and the at least one first dummy conductor, the plane direction extending along a face of the second layer,
the or each first dummy conductor includes a body and a plurality of mini-conductors, the mini-conductors being arranged between the body and the at least one first functional element, and/or between the body and the at least one first conductive line, and
the mini-conductors of the or each first dummy conductor are arranged or configured at a gradually reduced density from the end of the body toward the or each first functional element and/or toward the or each first conductive line, and some of the mini-conductors that are located in the vicinity of the body are integrated with the body.

13. The plastic laminate structure according to claim 3, wherein
the or each first dummy conductor includes a body and a plurality of mini-conductors, the mini-conductors being arranged between the body and the at least one first functional element, and/or between the body and the at least one first conductive line, and
the mini-conductors of the or each first dummy conductor are arranged or configured at a gradually reduced density from the end of the body toward the or each first functional element and/or toward the or each first conductive line, and some of the mini-conductors that are located in the vicinity of the body are integrated with the body.

14. The plastic laminate structure according to claim 12, wherein
the first layer further includes a decorative portion on the first or second face,
the decorative portion includes an opening and a circumferential portion around the opening, and
the mini-conductors are arranged below the circumferential portion.

15. The plastic laminate structure according to claim 13, wherein
the first layer further includes a decorative portion on the first or second face,
the decorative portion includes an opening and a circumferential portion around the opening, and
the mini-conductors are arranged below the circumferential portion.

16. The plastic laminate structure according to claim 2, wherein
the or each second dummy conductor includes a plurality of mini-conductors and a body,
the mini-conductors of the or each second dummy conductor include:
a first set of mini-conductors being provided near at least part of one of adjacent two of the first conductive lines, being arranged or configured at a gradually reduced density from an end of the corresponding body toward the one adjacent first conductive line, and including mini-conductors that are located near, and integral with, the corresponding body, and
a second set of mini-conductors provided near at least part of the other of the adjacent two first conductive lines, arranged or configured at a gradually reduced density from an end of the corresponding body toward the other adjacent first conductive line, and including mini-conductors that are located near, and integral with, the corresponding body.

17. The plastic laminate structure according to claim 3, wherein the or each second dummy conductor includes a plurality of mini-conductors and a body, the mini-conductors of the or each second dummy conductor include:

a first set of mini-conductors being provided near at least part of one of adjacent two of the first conductive lines, being arranged or configured at a gradually reduced density from an end of the corresponding body toward the one adjacent first conductive line, and including mini-conductors that are located near, and integral with, the corresponding body, and a second set of mini-conductors provided near at least part of the other of the adjacent two first conductive lines, arranged or configured at a gradually reduced density from an end of the corresponding body toward the other adjacent first conductive line, and including mini-conductors that are located near, and integral with, the corresponding body.

18. The plastic laminate structure according to claim 1, wherein the at least one first functional element comprises a plurality of first functional elements, and the first conductive lines are connected to the respective first functional elements.

19. The plastic laminate structure according to claim 3, wherein the at least one first functional element comprises a plurality of first functional elements, and the first conductive lines are connected to the respective first functional elements.

20. The plastic laminate structure according to claim 1, wherein the first conductive lines are electrically separated from each other.

21. The plastic laminate structure according to claim 3, wherein the first conductive lines are electrically separated from each other.

\* \* \* \* \*